(12) United States Patent
Ito et al.

(10) Patent No.: US 11,284,975 B2
(45) Date of Patent: *Mar. 29, 2022

(54) WORKPIECE UNIT

(71) Applicant: KURARAY NORITAKE DENTAL INC., Kurashiki (JP)

(72) Inventors: Yoshihisa Ito, Miyoshi (JP); Tetsuo Yamada, Nagoya (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 246 days.

This patent is subject to a terminal disclaimer.

(21) Appl. No.: 15/559,121

(22) PCT Filed: Mar. 18, 2016

(86) PCT No.: PCT/JP2016/058764
§ 371 (c)(1),
(2) Date: Sep. 18, 2017

(87) PCT Pub. No.: WO2016/148286
PCT Pub. Date: Sep. 22, 2016

(65) Prior Publication Data
US 2018/0243055 A1    Aug. 30, 2018

(30) Foreign Application Priority Data

Mar. 19, 2015  (JP) .............................. JP2015-056569

(51) Int. Cl.
*A61C 13/00*    (2006.01)
*A61C 13/083*   (2006.01)
(Continued)

(52) U.S. Cl.
CPC ............ *A61C 13/0022* (2013.01); *A61C 5/77* (2017.02); *A61C 7/14* (2013.01); *A61C 8/00* (2013.01);
(Continued)

(58) Field of Classification Search
None
See application file for complete search history.

(56) References Cited

U.S. PATENT DOCUMENTS 6,482,284 B1    11/2002  Reidt et al.
6,485,305 B1 *  11/2002  Pfeiffer .................. A61C 13/08
                                                       428/542.8
(Continued)

FOREIGN PATENT DOCUMENTS

DE       102007013675 B4 *   1/2011   ......... A61C 13/0022
DE    10 2011 055 393 A1     5/2013
(Continued)

OTHER PUBLICATIONS

Machine translation of WO 9530382. (Year: 1995).*
(Continued)

*Primary Examiner* — David Sample
*Assistant Examiner* — Elizabeth Collister
(74) *Attorney, Agent, or Firm* — Oblon, McClelland, Maier & Neustadt, L.L.P.

(57) ABSTRACT

A workpiece unit including a workpiece body having a protruding portion; and a holding member arranged on at least a part of an outer side of the protruding portion.

26 Claims, 29 Drawing Sheets

(51) Int. Cl.
*A61C 7/14* (2006.01)
*A61C 5/77* (2017.01)
*A61C 8/00* (2006.01)

(52) U.S. Cl.
CPC ........ *A61C 13/0003* (2013.01); *A61C 13/083* (2013.01)

(56) References Cited

U.S. PATENT DOCUMENTS

| | | | |
|---|---|---|---|
| 6,627,327 | B2 | 9/2003 | Reidt et al. |
| 8,506,294 | B2 | 8/2013 | Althoff et al. |
| 9,212,065 | B2 | 12/2015 | Yamada et al. |
| 2003/0073394 | A1 | 4/2003 | Reidt et al. |
| 2003/0132539 | A1 | 7/2003 | Althoff et al. |
| 2004/0072121 | A1 | 4/2004 | Filser et al. |
| 2007/0275352 | A1* | 11/2007 | Gubler ............... A61C 13/0004 433/201.1 |
| 2009/0075238 | A1* | 3/2009 | Galehr ............... A61C 13/0022 433/213 |
| 2010/0028836 | A1* | 2/2010 | Gubler ............... A61C 5/77 433/223 |
| 2013/0216323 | A1 | 8/2013 | Reck et al. |
| 2013/0261323 | A1 | 10/2013 | Peters et al. |
| 2014/0328746 | A1 | 11/2014 | Yamada et al. |

FOREIGN PATENT DOCUMENTS

| | | |
|---|---|---|
| DE | 20 2013 103 515 U1 | 9/2013 |
| JP | 2000-070289 | 3/2000 |
| JP | 2004-507316 A | 3/2004 |
| JP | 2006-142029 | 6/2006 |
| JP | 2006-521842 A | 9/2006 |
| JP | 2007-54651 A | 3/2007 |
| JP | 2010-131395 | 6/2010 |
| JP | 2013-119485 A | 6/2013 |
| JP | 2014-218389 A | 11/2014 |
| WO | WO 95/30382 A1 | 11/1995 |
| WO | WO 2011/029615 A1 | 3/2011 |
| WO | WO 2013/117540 A1 | 8/2013 |

OTHER PUBLICATIONS

Machine translation of DE 202013103515U1. (Year: 2013).*
Machine translation of DE 102007013675 B4. (translated via google patents Oct. 21, 2020) (Year: 2008).*
Extended European Search Report dated Sep. 12, 2018 in Patent Application No. 16765115.7, 8 pages.
English translation of the International Preliminary Report on Patentability and Written Opinion dated Sep. 28, 2017 in PCT/JP2016/058764.
International Search Report dated May 24, 2016 in PCT/JP2016/058764 filed Mar. 18, 2016.
Japanese Office Action dated Feb. 12, 2020, in Patent Application No. 2017-506221, 7 pages (with unedited computer generated English translation).
Combined Chinese Office Action and Search Report dated Sep. 29, 2019, in Patent Application No. 201680016803.3, 15 pages (with unedited computer generated English translation and English Translation of Category of Cited Documents).
Office Action dated Apr. 7, 2020, in European Patent Application No. 16765115.7 filed on Mar. 18, 2016, 5 pages.
Japanese Office Action dated Jul. 27, 2021, in Japanese Patent Application No. 2020-142988 (with English Translation).
Office Action in Japanese Patent Application 2020-142988 dated Jan. 18, 2022 (w/English Machine Translation).

* cited by examiner

[Fig. 1]
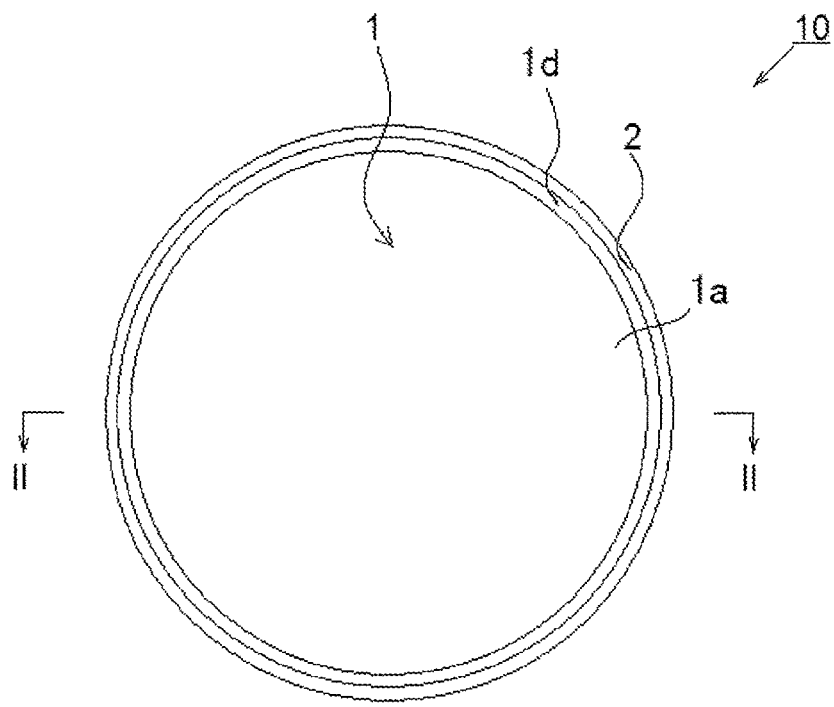
[Fig. 2]
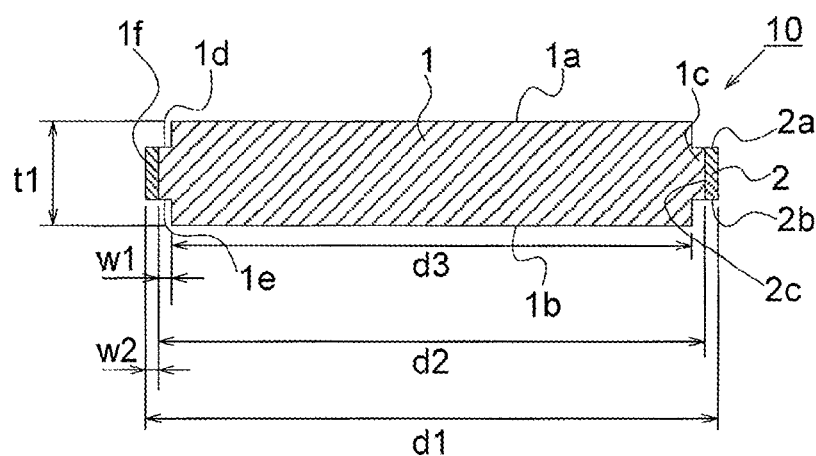

[Fig. 3]
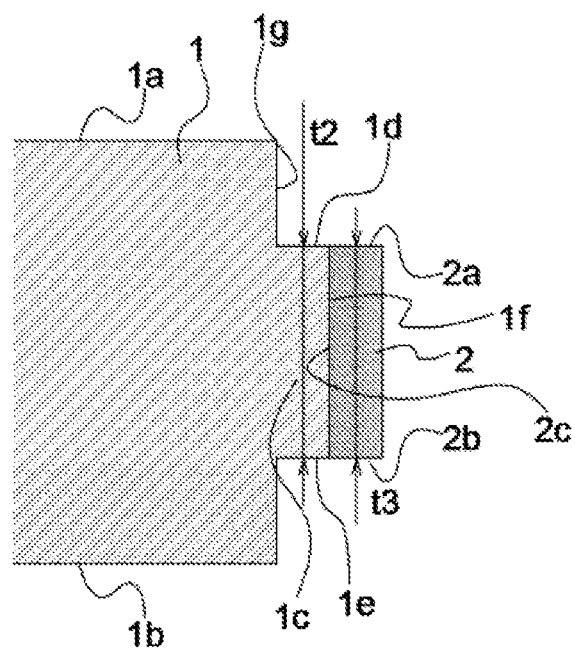

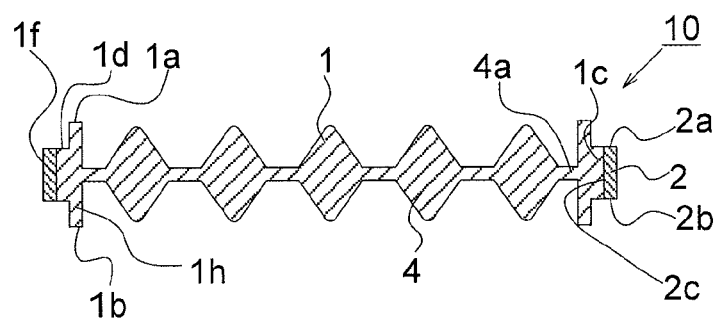
[Fig. 4]

[Fig. 5]
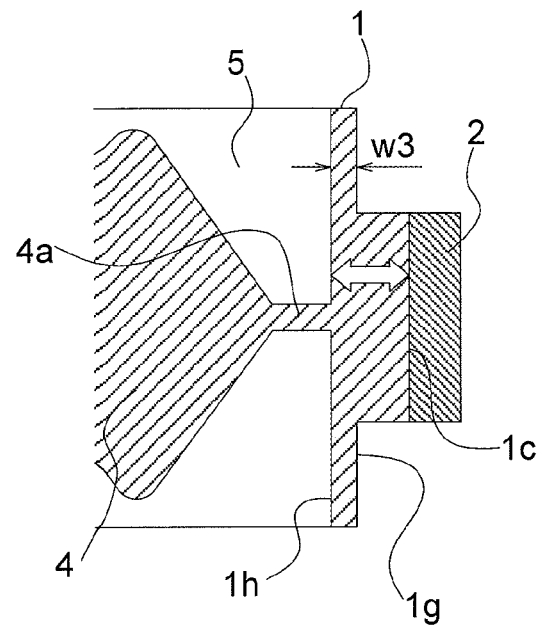
[Fig. 6]
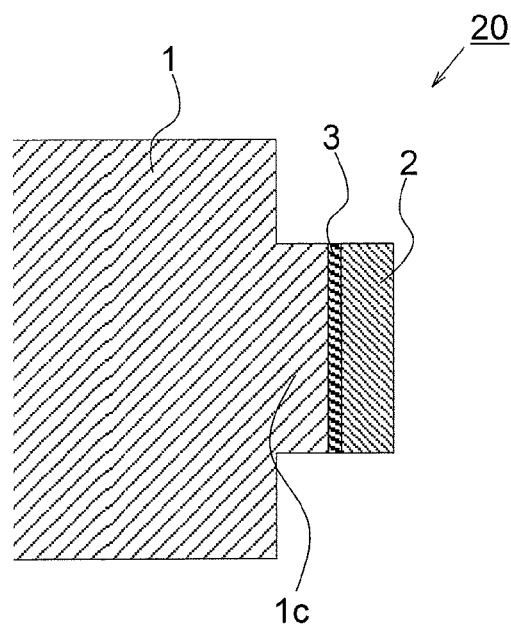

[Fig. 7]
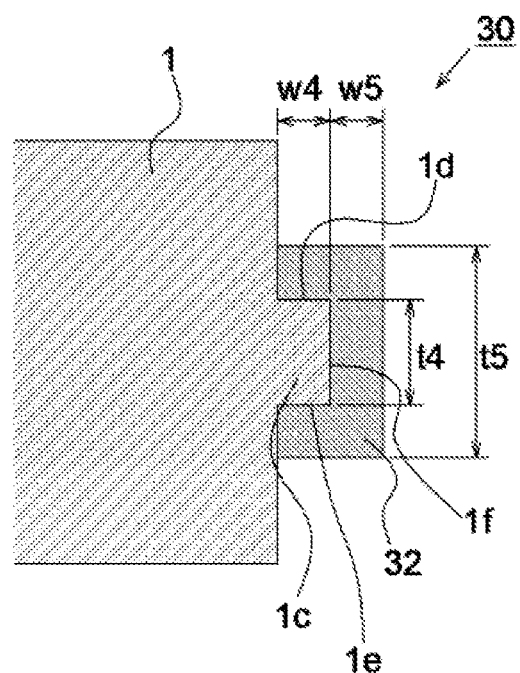

[Fig. 8]
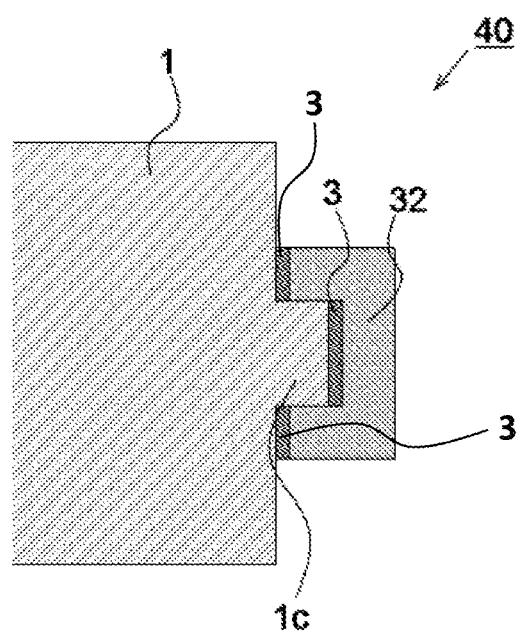

[Fig. 9]
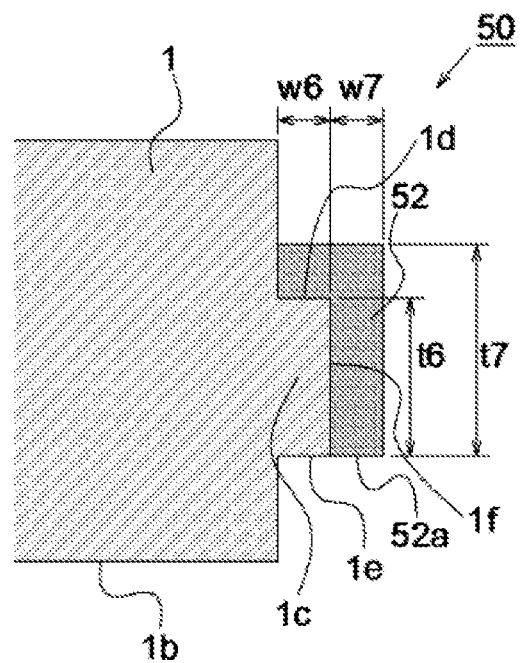

[Fig. 10]
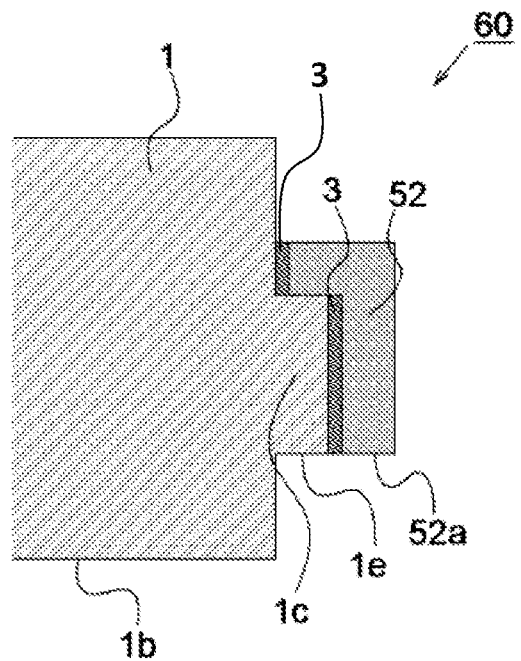

[Fig. 11]
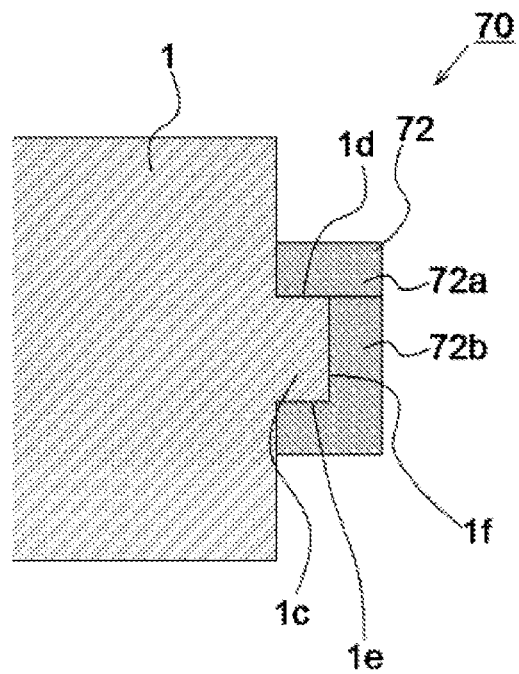

[Fig. 12]
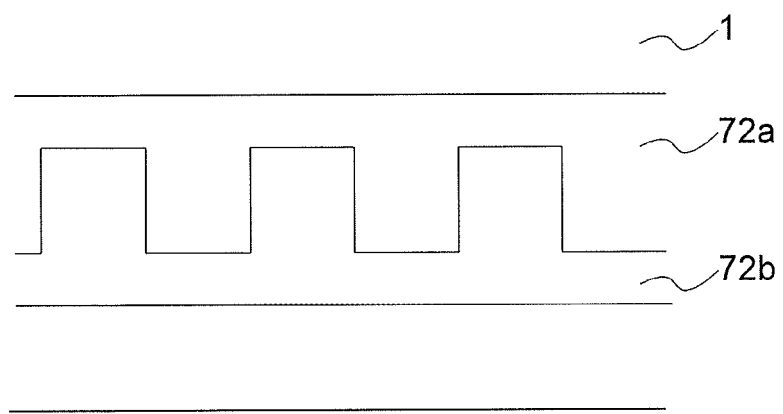

[Fig. 13]
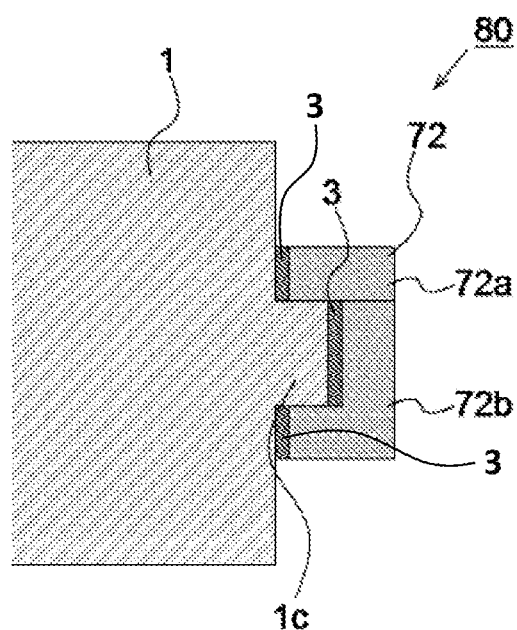

[Fig. 14]
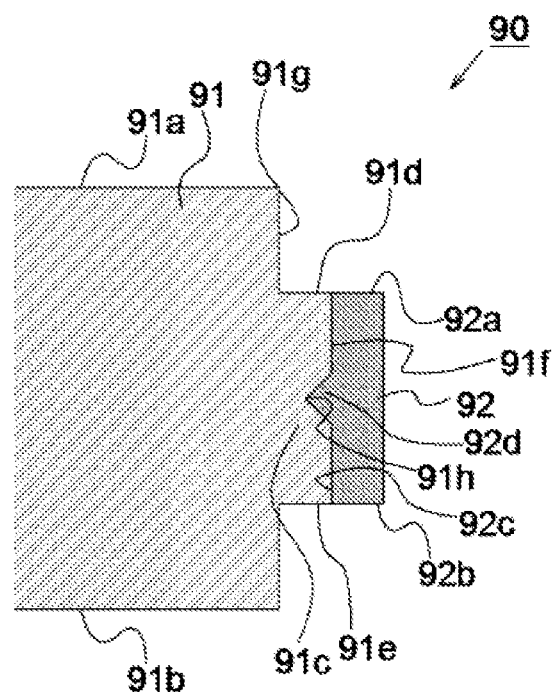

[Fig. 15]
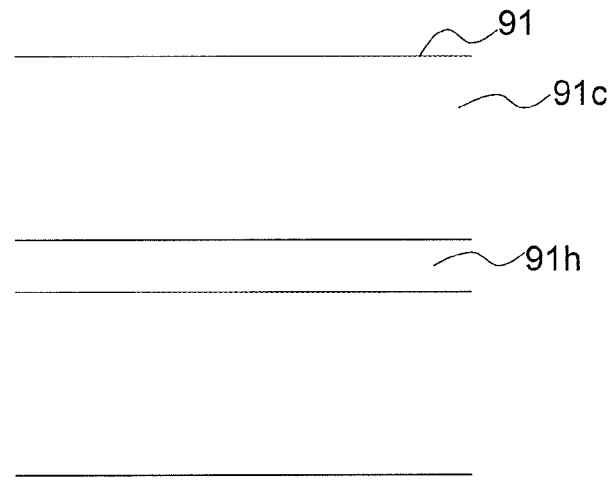
[Fig. 16]
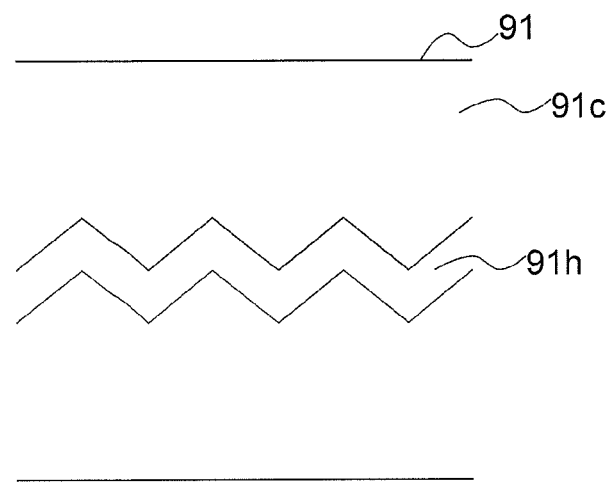
[Fig. 17]
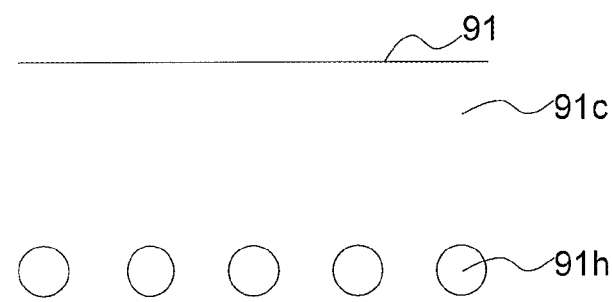

[Fig. 18]
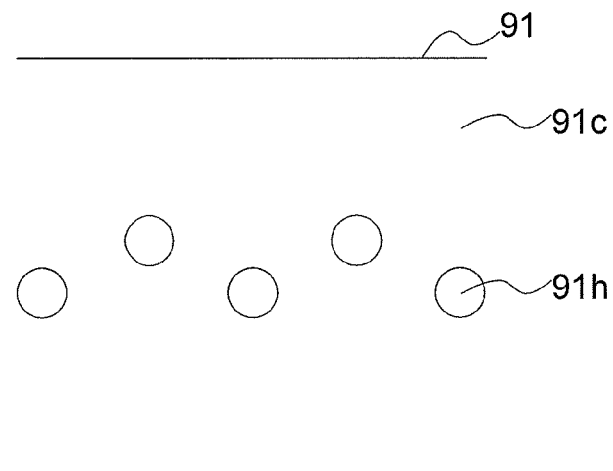
[Fig. 19]
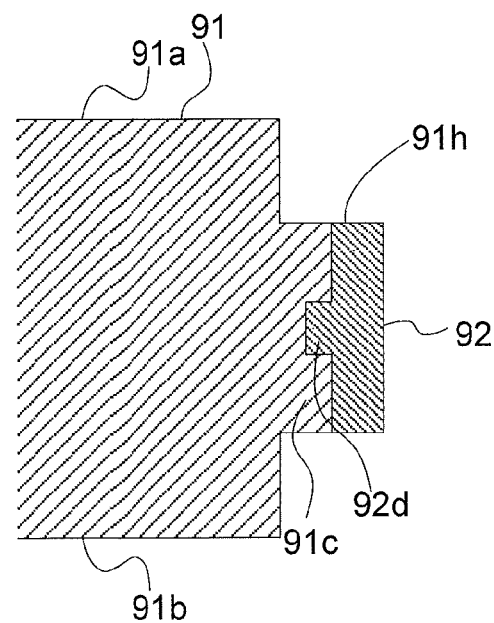

[Fig. 20]
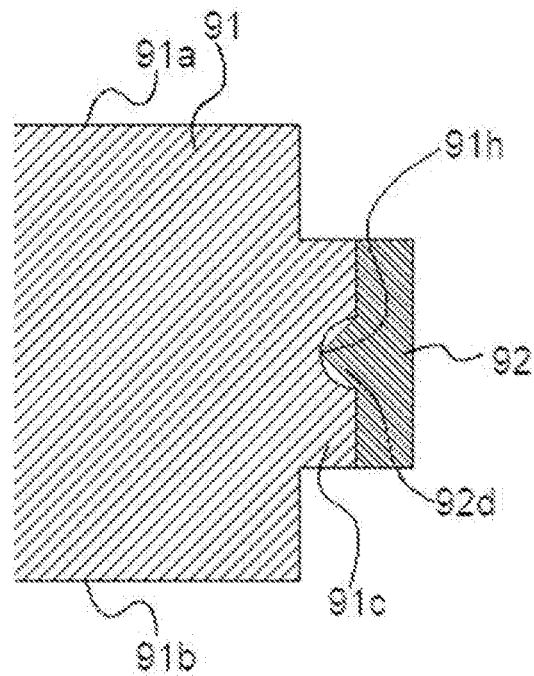
[Fig. 21]
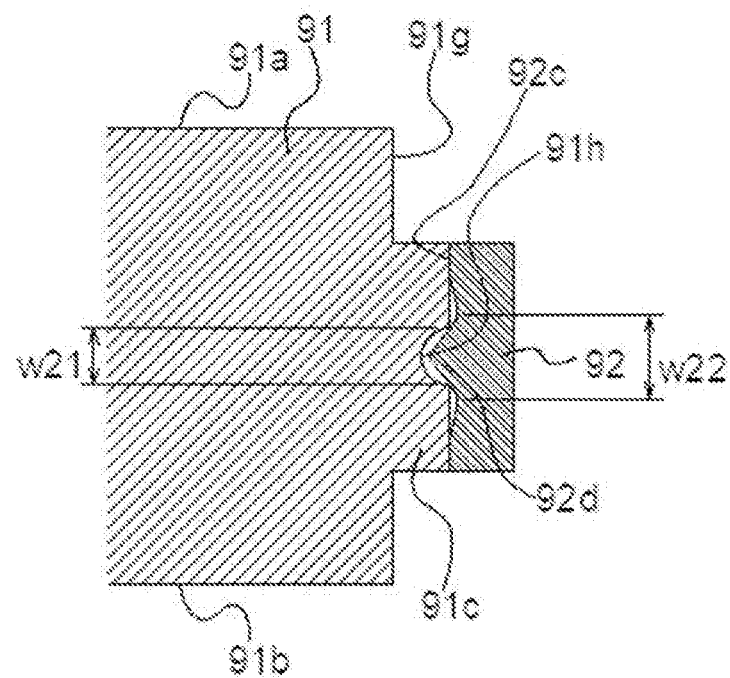

[Fig. 22]
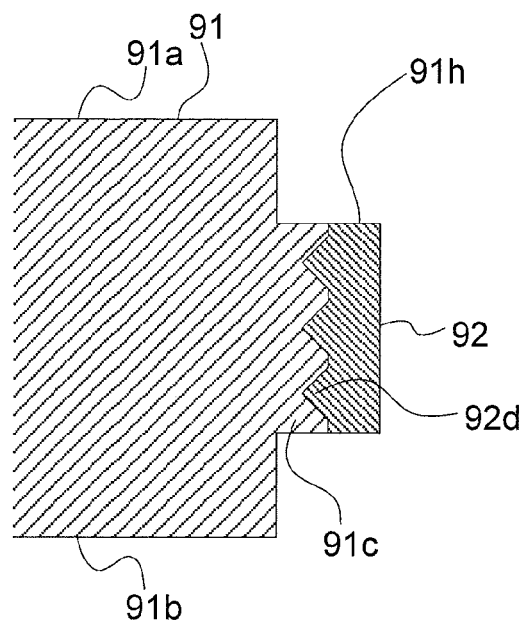

[Fig. 23]
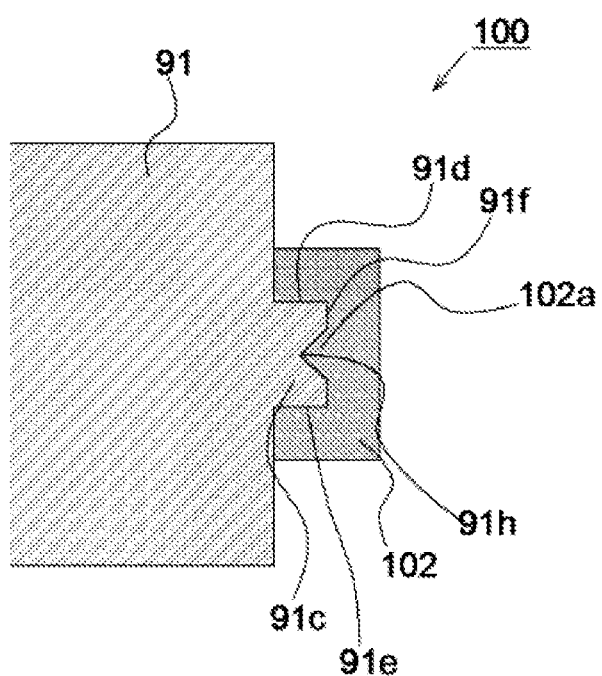

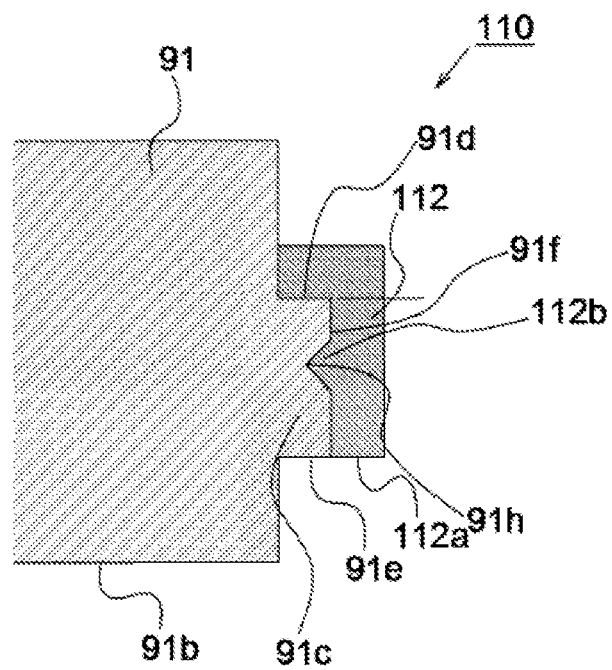
[Fig. 24]

[Fig. 25]
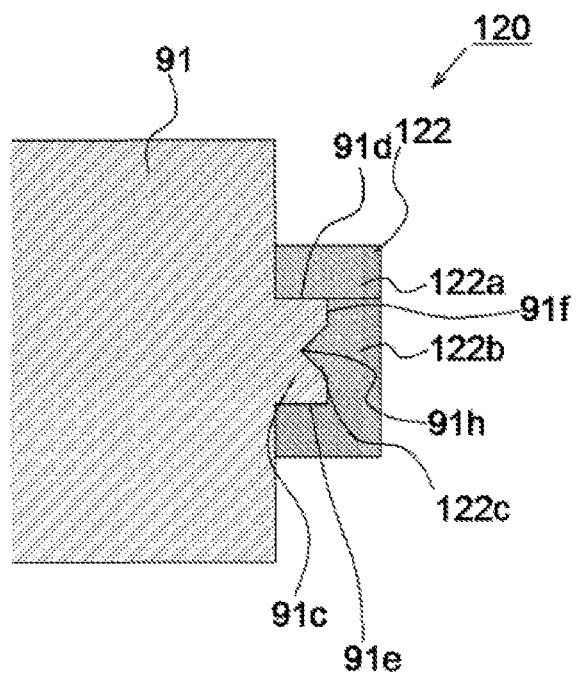

[Fig. 26]
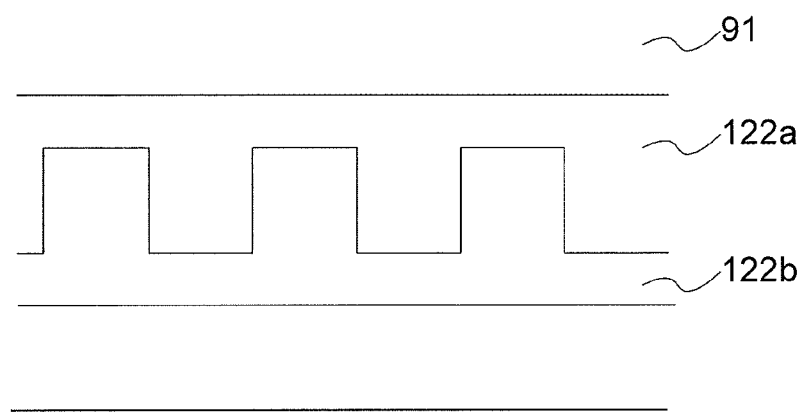

[Fig. 27]
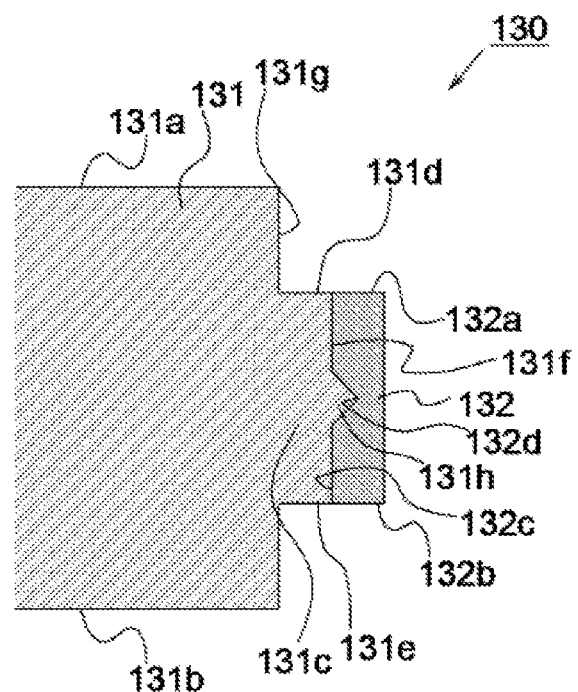

[Fig. 28]
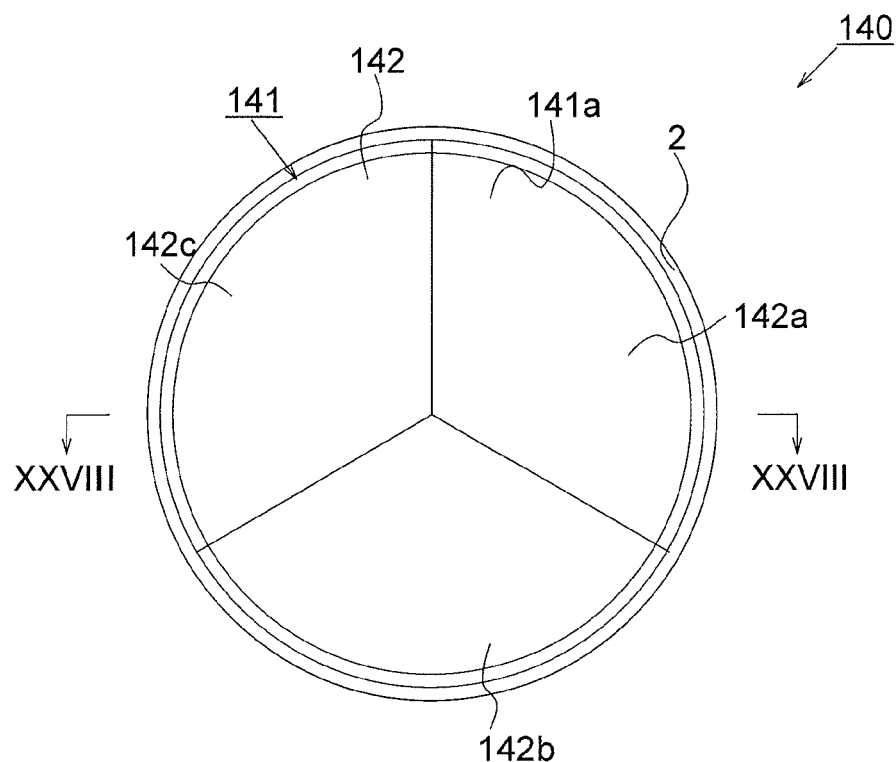
[Fig. 29]
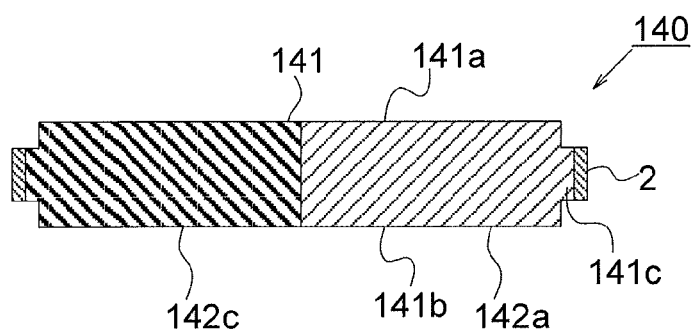

[Fig. 30]
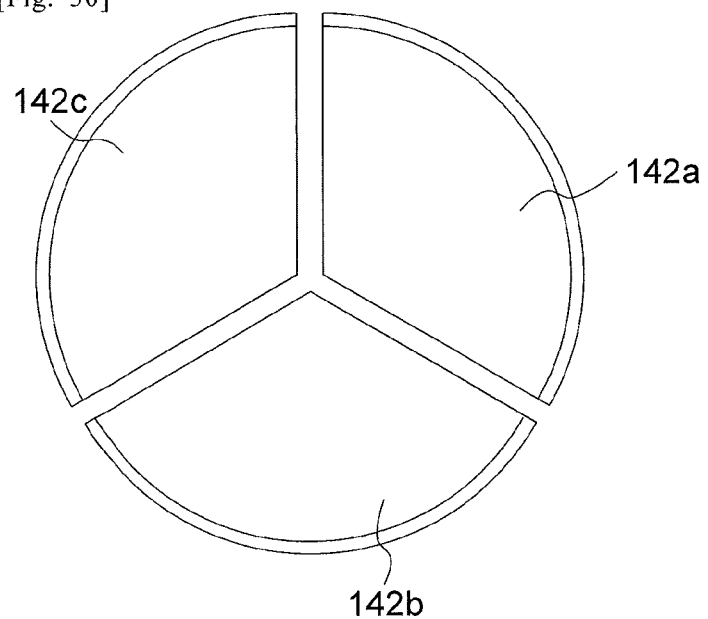
[Fig. 31]
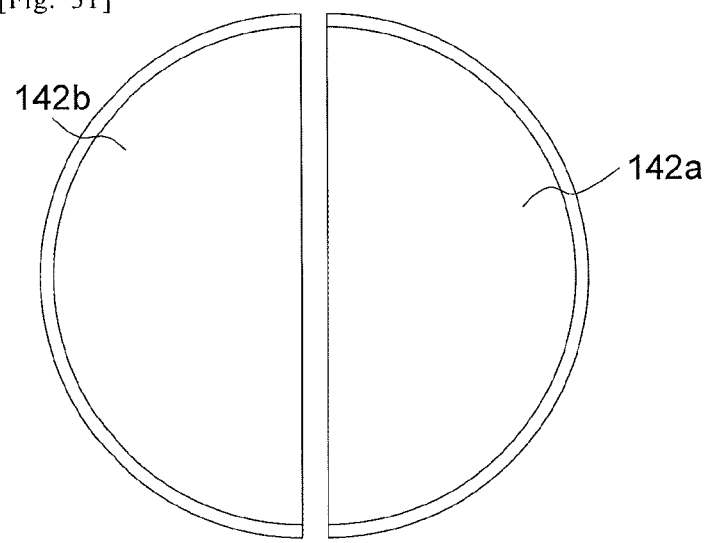

[Fig. 32]
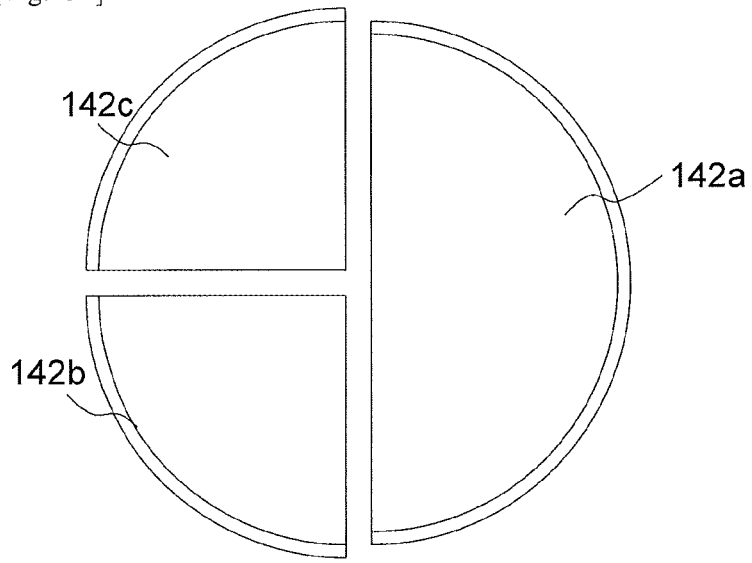
[Fig. 33]
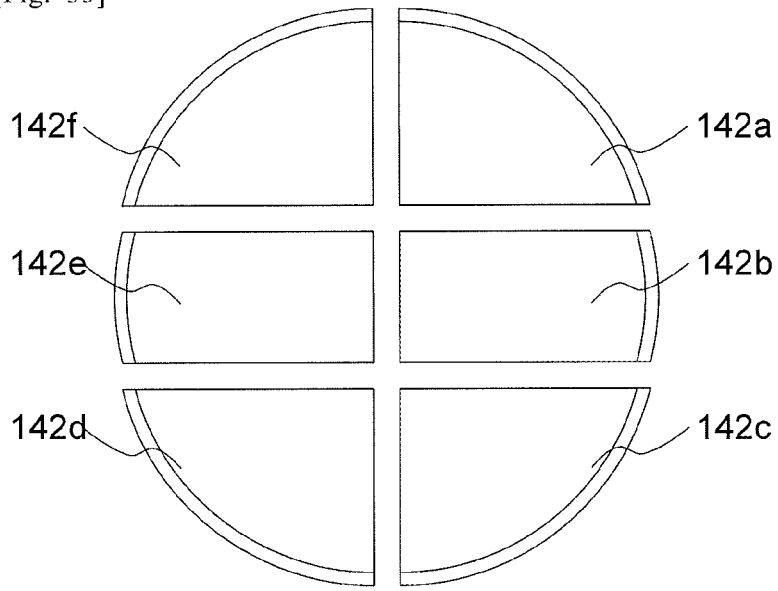

[Fig. 34]
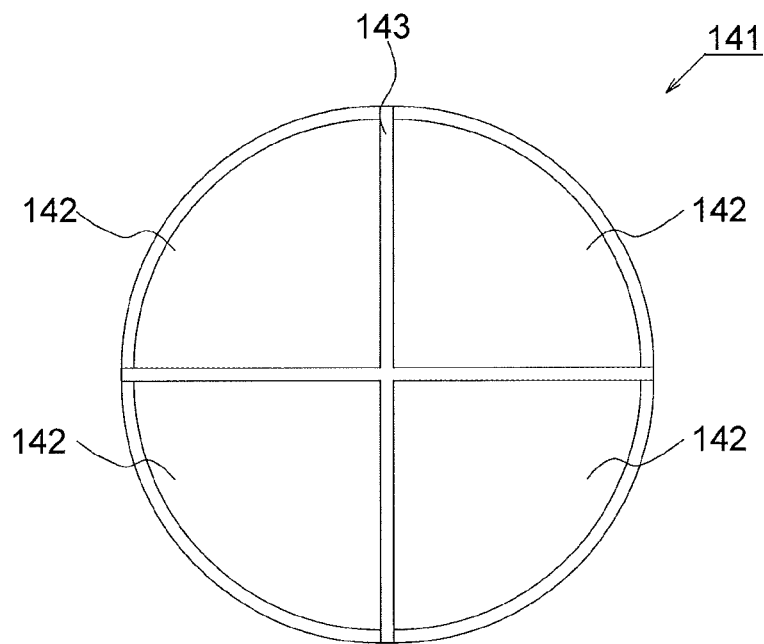
[Fig. 35]
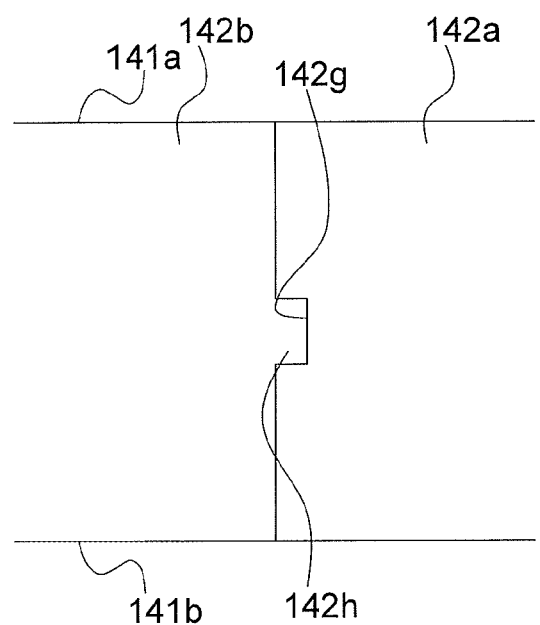

[Fig. 36]
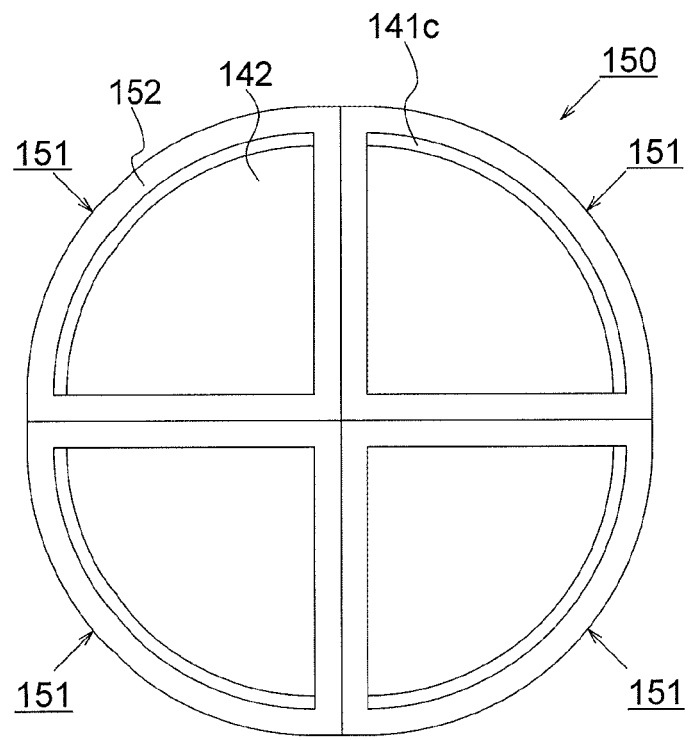
[Fig. 37]
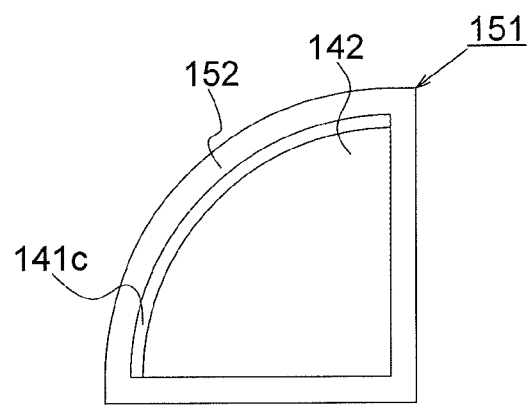

[Fig. 38]
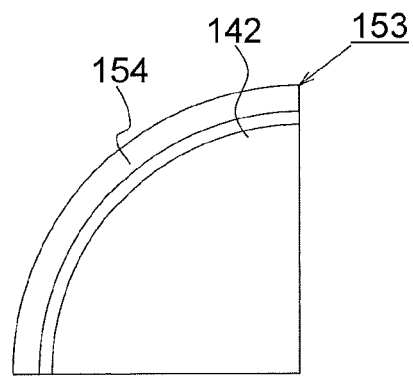
[Fig. 39]
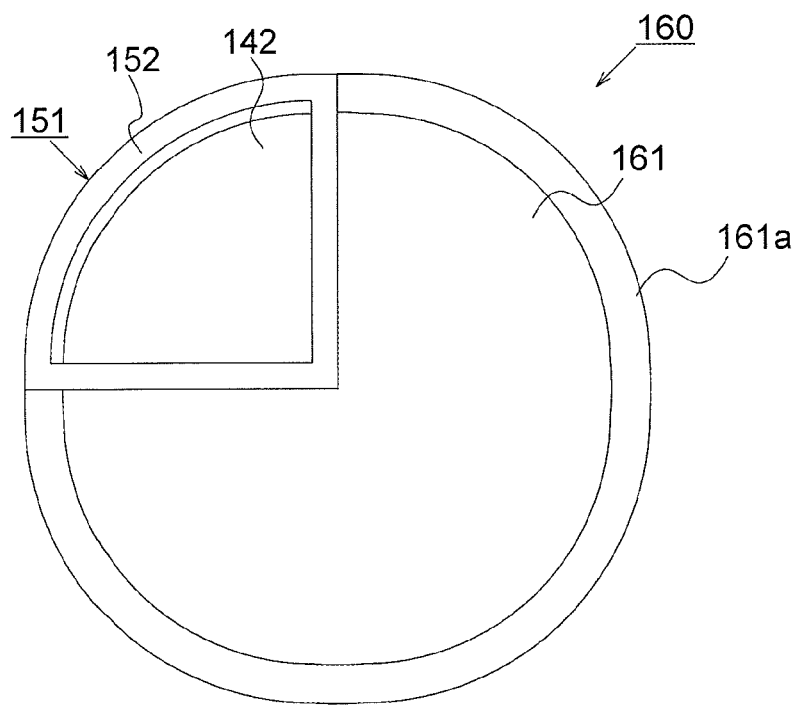

[Fig. 40]
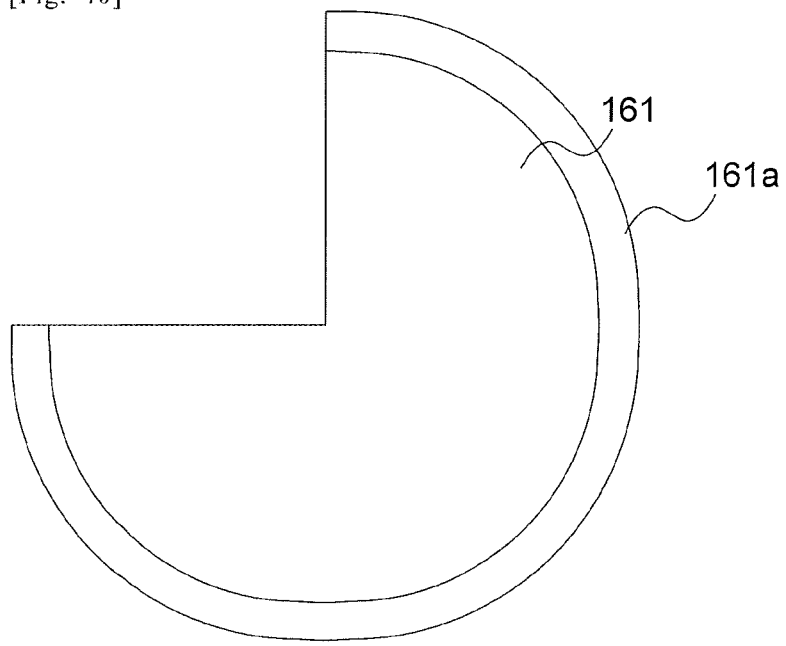
[Fig. 41]
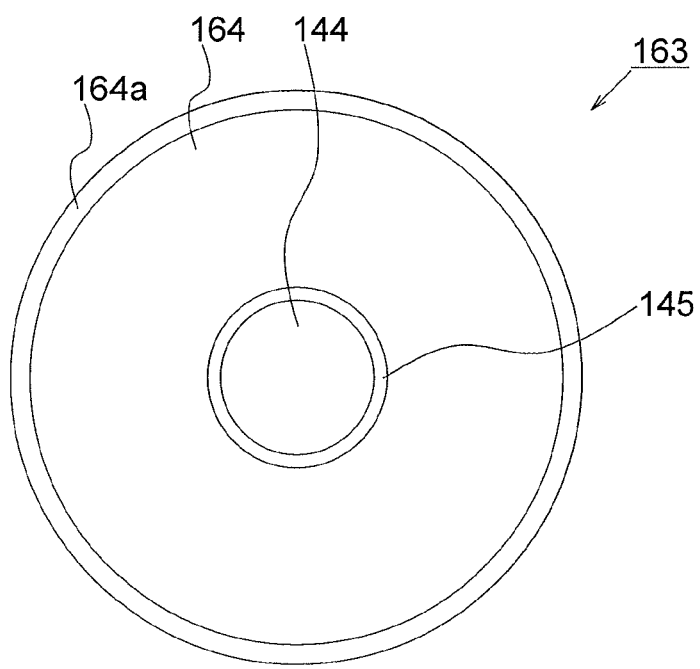

[Fig. 42]
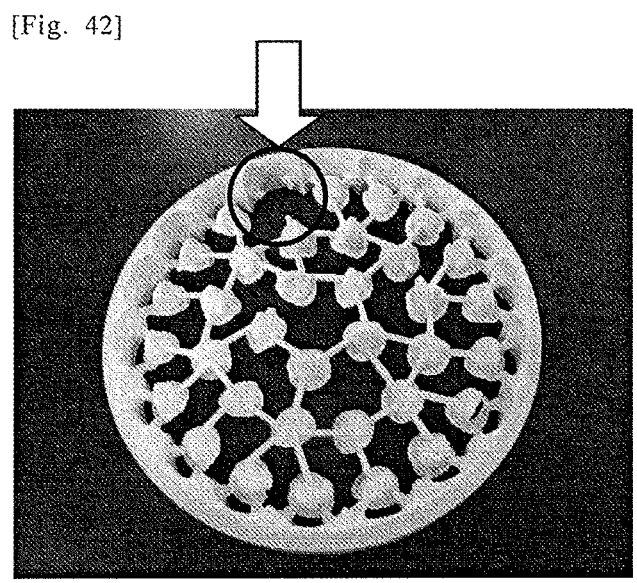

WORKPIECE UNIT

TECHNICAL FIELD

Reference to Related Application

The present invention is based upon the priority of Japanese patent application No. 2015-056569 filed on Mar. 19, 2015, the disclosure of which is incorporated herein in its entirety by reference thereto.

The present invention relates to a workpiece unit having a workpiece body for machining processing.

BACKGROUND

When machining a workpiece body such as ceramic, metal or the like to a three-dimensional shape, an end portion of a workpiece unit is held and processed. This workpiece body is also called "blank". For example, in the dental industry, an outer edge region of a circular plate (disk) shaped zirconia being a workpiece body is held by a processing apparatus and the prosthesis is cut out.

Therefore, in the method for manufacturing a dental prosthesis described in Patent literature 1, a blank is fixed to a processing apparatus by attaching a ring to an outer edge of a blank via an adhesive and fixing the ring to a chuck of a processing apparatus.

CITATION LIST

Patent Literatures

[Patent Literature 1] WO95/30382A

SUMMARY

Technical Problem

The following analysis is given in view of the present invention.

In the processing of a circular plate (disk) shaped workpiece body (blank) as described in Patent Literature 1, the workpiece body is cut out in a state in which a worked item as a target is connected to an outer edge portion while leaving the outer edge portion of the workpiece body in a frame shape. In order to utilize the workpiece body without waste, the workpiece body is processed to areas close to its outer edge. That is, the remaining outer edge portion of the workpiece body after processing becomes thin. Since the strength of the thinned outer edge portion is low, there is a possibility that by a slight impact, the workpiece body damages, and the prosthesis formed to be connected to the thinned portion falls off. FIG. 42 shows a photograph of the workpiece body after processing. In the portion marked with a circle mark, the workpiece body has fallen off.

Further, there is also occurrence of a case where the attachment position of the workpiece body to the processing apparatus may shift in the lateral direction. In this case, a portion thinner than a prescribed size is formed by the shift on the outer edge portion of the workpiece body after processing. Then, the same problem as described above arises.

On the other hand, if a portion (a portion corresponding to a ring) to be held to the processing apparatus is made as a part of a workpiece body without using the ring described in Patent Literature 1, since the diameter becomes large, a large amount of raw materials of the workpiece body is used. When the cost of the workpiece body is higher than that of the ring, the manufacturing cost increases since amount of the production of the worked item does not change.

Therefore, it is desired to suppress the increase in the manufacturing cost while enhancing the strength of the outer edge portion of the workpiece body after processing.

According to a first aspect of the present disclosure, a workpiece unit comprises a workpiece body having a protruding portion, and a holding member arranged on at least a part of an outer side of the protruding portion.

By providing the protruding portion, since the protruding portion remains on the outer edge portion of the workpiece body after processing, the strength of the outer edge portion can be enhanced. Thereby, fracture caused by lowering in strength of the outer edge portion can be suppressed.

By providing the holding member, the size (for example, diameter) of the workpiece body can be made smaller by an amount corresponding to the width of the holding member, and thus the amount of raw materials used for the workpiece body can be reduced. Thereby, an increase in manufacturing cost can be suppressed.

BRIEF DESCRIPTION OF THE DRAWINGS

FIG. 1

A schematic plan view of a workpiece unit according to a first exemplary embodiment of the present disclosure.

FIG. 2

A schematic cross-sectional view of the workpiece unit along line II-II of FIG. 1.

FIG. 3

A schematic partial cross-sectional view of the workpiece unit according to the first exemplary embodiment of the present disclosure.

FIG. 4

A schematic cross-sectional view of the workpiece unit according to the first exemplary embodiment of the present disclosure after processing.

FIG. 5

A schematic partial cross-sectional view of a workpiece unit according to the first exemplary embodiment of the present disclosure after processing.

FIG. 6

A schematic partial cross-sectional view of a workpiece unit according to a second exemplary embodiment of the present disclosure.

FIG. 7

A schematic partial cross-sectional view of a workpiece unit according to a third exemplary embodiment of the present disclosure.

FIG. 8

A schematic partial cross-sectional view of a workpiece unit according to a fourth exemplary embodiment of the present disclosure.

FIG. 9

A schematic partial cross-sectional view of a workpiece unit according to a fifth exemplary embodiment of the present disclosure.

FIG. 10

A schematic partial cross-sectional view of a workpiece unit according to a sixth exemplary embodiment of the present disclosure.

FIG. 11

A schematic partial cross-sectional view of a workpiece unit according to a seventh exemplary embodiment of the present disclosure.

FIG. 12

A schematic partial plan view of a workpiece unit according to the seventh exemplary embodiment of the present disclosure.

FIG. 13

A schematic partial cross-sectional view of a workpiece unit according to a fourteenth exemplary embodiment of the present disclosure.

FIG. 14

A schematic partial cross-sectional view of a workpiece unit according to a ninth exemplary embodiment of the present disclosure.

FIG. 15

A schematic plan view of an example according to a first positioning portion and a second positioning portion.

FIG. 16

A schematic plan view of an example according to a first positioning portion and a second positioning portion.

FIG. 17

A schematic plan view of an example according to a first positioning portion and a second positioning portion.

FIG. 18

A schematic plan view of an example according to a first positioning portion and a second positioning portion.

FIG. 19

A schematic cross-sectional view of an example according to a first positioning portion and a second positioning portion.

FIG. 20

A schematic cross-sectional view of an example according to a first positioning portion and a second positioning portion.

FIG. 21

A schematic cross-sectional of view an example according to a first positioning portion and a second positioning portion.

FIG. 22

A schematic cross-sectional of view an example according to a first positioning portion and a second positioning portion.

FIG. 23

A schematic partial cross-sectional view of a workpiece unit according to a tenth exemplary embodiment of the present disclosure.

FIG. 24

A schematic partial cross-sectional view of a workpiece unit according to an eleventh exemplary embodiment of the present disclosure.

FIG. 25

A schematic partial cross-sectional view of a workpiece unit according to a twelfth exemplary embodiment of the present disclosure.

FIG. 26

A schematic partial plan view of a workpiece unit according to the twelfth exemplary embodiment of the present disclosure.

FIG. 27

A schematic partial cross-sectional view of a workpiece unit according to a thirteenth exemplary embodiment of the present disclosure.

FIG. 28

A schematic plan view of a workpiece unit according to the eleventh exemplary embodiment of the present disclosure.

FIG. 29

A schematic cross-sectional view of the workpiece unit along line XXVIII-XXVIII of FIG. 28.

FIG. 30

A schematic plan view of a workpiece body according to an example of a plane shape of a section.

FIG. 31

A schematic plan view of a workpiece body according to an example of a plane shape of a section.

FIG. 32

A schematic plan view of a workpiece body according to an example of a plane shape of a section.

FIG. 33

A schematic plan view of a workpiece body according to an example of a plane shape of a section.

FIG. 34

A schematic plan view of a workpiece body according to another mode of the workpiece body according to the eleventh exemplary embodiment of the present disclosure.

FIG. 35

A schematic side view of a workpiece body according to another mode of the workpiece body according to the eleventh exemplary embodiment of the present disclosure.

FIG. 36

A schematic plan view of a workpiece unit according to the twelfth exemplary embodiment of the present disclosure.

FIG. 37

A schematic plan view of a section unit according to the twelfth exemplary embodiment of the present disclosure.

FIG. 38

A schematic plan view of a section unit according to another mode of that shown in FIG. 37.

FIG. 39

A schematic plan view of a workpiece unit according to the thirteenth exemplary embodiment of the present disclosure.

FIG. 40

A schematic plan view of a dummy workpiece body according to the thirteenth exemplary embodiment of the present disclosure.

FIG. 41

A schematic plan view of a workpiece unit according to the thirteenth exemplary embodiment of the present disclosure.

FIG. 42

A photograph of a workpiece after processing for explaining a background art.

In the following description, reference signs in the drawings are added for understanding of the disclosure, and are not intended to be limited to the illustrated modes. In each exemplary embodiment, the same reference signs are put to the same elements. The dimensions and the dimensional ratios of the drawings are not intended to be limited to the illustrated modes.

Preferred modes of the above each aspect are described below.

According to a preferred mode of the first aspect, the workpiece body has a plate shape. The protruding portion protrudes from a side face of the workpiece body. The holding member is arranged in at least a protruding direction of the protruding portion.

According to a preferred mode of the first aspect, the workpiece body has a first surface, a second surface arranged on a side opposite to the first surface, and an outer circumferential portion(s) provided between the first and second surfaces. The protruding portion is arranged on the outer circumferential portion(s).

According to a preferred mode of the first aspect, the protruding portion is continuously arranged along the outer circumferential portion(s) of the workpiece body. The holding member has a ring shape.

According to a preferred mode of the first aspect, the protruding portion has a third surface directed in the same direction as the first surface, a fourth surface directed in the same direction as the second surface, and a fifth surface connecting the third and fourth surfaces. The holding member covers at least a part of the fifth surface.

According to a preferred mode of the first aspect, the holding member has a first surface directed in the same direction as the third surface of the protruding portion and a second surface directed in the same direction as the fourth surface of the protruding portion.

According to a preferred mode of the first aspect, the first surface of the holding member forms the same plane as the third surface of the protruding portion, or exists on the first surface side of the workpiece body than the third surface of the protruding portion.

According to a preferred mode of the first aspect, the second surface of the holding member forms the same plane as the fourth surface of the protruding portion, or forms the same plane as the fourth surface of the protruding portion, or exists on the second surface side of the workpiece body than the fourth surface of the protruding portion.

According to a preferred mode of the first aspect, the holding member further covers at least a part of the third and fourth surfaces of the protruding portion.

According to a preferred mode of the first aspect, the workpiece body has at least one first positioning portion in a part facing the holding member in the protruding portion. The holding member has a second positioning portion engaging with at least a part of the first positioning portion.

According to a preferred mode of the first aspect, the first positioning portion has a concave or convex shape. The second positioning portion has a shape fitting or engaging with the first positioning portion. At least a part of one of the first and second positioning portions fits or engages with at least a part of the other.

According to a preferred mode of the first aspect, one among the first and second positioning portions has a concave shape and the other has a convex shape. The convex shape has a width equal to or larger than that of the concave shape. A part of the convex shape is inserted into the concave shape.

According to a preferred mode of the first aspect, the first positioning portion is arranged over the entire circumference of the workpiece body.

According to a preferred mode of the first aspect, the first or second positioning portion has a groove shape.

According to a preferable mode of the first aspect, the first or second positioning portion has a conical or columnar shape.

According to a preferred mode of the first aspect, the holding member is composed of two or more parts.

According to a preferred mode of the first aspect, each part of the holding member has a concave or convex portion, respectively. Each of the parts is arranged so as to fit the concave and convex portions each other.

According to a preferred mode of the first aspect, the workpiece body is ceramic, metal or resin.

According to a preferred mode of the first aspect, the workpiece body is a pre-sintered body in which zirconia crystal grains are not completely sintered.

According to a preferred mode of the first aspect, the holding member is bonded to the workpiece body via an adhesive.

According to a preferred mode of the first aspect, the holding member and the workpiece body are in direct contact with each other.

According to a preferred mode of the first aspect, the holding member is plastic.

According to a preferred mode of the first aspect, the thickness of the protruding portion and that of the holding member are substantially the same.

According to a preferred mode of the first aspect, the width of the protruding portion in the protruding direction is 0.3 mm to 2 mm.

According to a preferred mode of the first aspect, the protruding portion is arranged at a central area in the thickness direction of the workpiece body.

According to a preferred mode of the first aspect, the workpiece body comprises a worked item formed by processing the workpiece body, the worked item being connected to the protruding portion or the outer edge portion.

A workpiece unit according to a first exemplary embodiment of the present disclosure is explained. FIG. 1 shows a schematic plan view of a workpiece unit. FIG. 2 shows a schematic cross-sectional view of the workpiece unit along line II-II in FIG. 1. FIG. 3 shows a schematic partial cross-sectional view of a part of the protruding portion and the holding member.

The workpiece unit 10 comprises a workpiece body 1 and a holding member 2 arranged on at least a part of the side wall of the workpiece body 1. The workpiece body 1 is processed, for example, by a processing apparatus. For example, in the dental field, dental products are made from the workpiece body 1. As a dental product, for example, a prosthesis such as a ceramic frame, full contour crown or the like can be given. The dental prosthesis preferably has a crown shape. Also, as dental products, for example, orthodontic products (for example, orthodontic brackets) and dental implant products (for example, dental implant abutments) can be given. The holding member 2 assists in holding or fixing the workpiece unit 10 to the processing apparatus. For example, when holding or fixing the workpiece unit to the processing apparatus, at least the holding member 2 in the workpiece unit 10 is held to the processing apparatus.

The workpiece body 1 has a first surface 1a as a surface-to-be-processed and a second surface 1b opposite to the first surface 1a. It is preferable that the first and second surfaces 1a, 1b are parallel or substantially parallel. It is preferable that the workpiece body 1 has a flat plate shape. Although in the exemplary embodiment shown in FIG. 1, the workpiece unit 10 and the workpiece body 1 have a circular planar shape, they are not limited to a circular shape and may have a planar shape such as an elliptical shape, a polygonal shape or the like.

The workpiece body 1 has a protruding portion 1c for holding the workpiece unit 10 to the processing apparatus along at least a part of the side wall, that is, on the outer circumferential portion(s) 1g of an outer edge of the first and second surfaces 1a, 1b or between the first and second surfaces 1a, 1b. It is preferable that the protruding portion 1c is a portion for holding the workpiece unit 10 in the processing apparatus. It is preferable that there is the protruding portion 1c in a region not processed to the processing apparatus. It is preferable that the protruding portion 1c is continuously arranged over the entire circumference of the outer circumferential portion(s) 1g of the workpiece body 1. That is, it is preferable that the protruding portion 1c has a ring or annular shape. The protruding portion 1c may have a mode (protruding portion) protruding from the side face of the workpiece body 1. For example, the protruding portion 1c protrudes in a direction substantially vertical [sic. parallel] to the first and second surfaces 1a, 1b between the first and second surfaces 1a, 1b of the workpiece body 1. There is the protruding portion 1c on the outer circumferential portion(s) 1g of the workpiece body 1 and the protruding portion 1c has a mode such that the end portion of the workpiece body 1 is thinner than the other portion.

The protruding portion 1c may have a third surface 1d directed in the same direction as the first surface 1a, and a fourth surface 1e directed in the same direction as the second surface 1b. The protruding portion 1c may have a fifth surface 1f connecting the third surface 1d and the fourth surface 1e. It is preferable that the third and the fourth surfaces 1d, 1e are parallel or substantially parallel. It is preferable that the third and first surfaces 1d, 1a are parallel or substantially parallel. It is preferable that the fourth and second surfaces 1e, 1b are parallel or substantially parallel. It is preferable that the third and fifth surfaces 1d, 1f are perpendicular or substantially perpendicular. It is preferable that the fourth and fifth surfaces 1e, 1f are preferably perpendicular or substantially perpendicular. It is preferable that the first, second and fifth surfaces 1a, 1b, 1f are preferably perpendicular or substantially perpendicular. It is preferable that the thickness t2 of the protruding portion 1c is thinner than the thickness t1 of the entire workpiece body 1. That is, it is preferable that a step is formed between the first and third surfaces 1a, 1d. It is preferable that a step is formed between the second and fourth surface 1b, 1e. Thereby, the positioning can be made easier when fixing the workpiece unit 10 to the processing apparatus. It should be noted that the first and third surfaces 1a, 1d may form the same plane. Further, the second and fourth surfaces 1b, 1e may form the same plane.

The thickness t2 of the protruding portion 1c is preferably 1 mm or more, more preferably 2 mm or more, and furthermore preferably 4 mm or more. This is for holding the workpiece unit 10 during processing and for reinforcing the workpiece body 1 after processing.

The width w1 of the protruding portion 1c is preferably 2 mm or less, more preferably 1.7 mm or less, and furthermore preferably 1.5 mm or less. This is because if the width w1 of the protruding portion 1c is too large, the waste portion in (of) the workpiece body 1 becomes large. Also, the width w1 of the protruding portion 1c is preferably 0.3 mm or more, preferably 0.4 mm or more, more preferably 0.6 mm or more, and furthermore preferably 0.8 mm or more. The protruding portion 1c has an action reinforcing the workpiece body 1 after processing. This is because a uniform width is required for the protruding portion 1c in order to reinforce the workpiece body 1 after processing.

It is preferable that the protruding portion 1c is arranged at a central area of the workpiece body 1 in the thickness direction of the workpiece body 1. That is, it is preferable that the center in the thickness direction of the protruding portion 1c overlaps with the center in the thickness direction of the workpiece body 1. Thereby, the positioning can be made easier when setting the workpiece unit 10 to the processing apparatus.

It is preferable that the workpiece unit 10 is symmetrical with respect to the extending direction of the first and second surfaces 1a, 1b of the workpiece body 1. For example, it is preferable that both of the first and second surfaces 1a, 1b of the workpiece body 1 can be set on the processing apparatus toward the processing tool (usually the upper side).

The size d2 of the whole of the workpiece body 1, the size d3 of the first and second surfaces 1a, 1b as a surface-to-be-processed (termed as "processing surface") of the workpiece body 1, and the thickness t1 of the workpiece body 1 can be appropriately set according to purpose.

As a material of the workpiece body 1, for example, ceramic, metal, resin or the like can be used. As examples of the ceramic, a material containing at least one among zirconia, alumina and crystallized glass can be given. As examples of metals, titanium, titanium alloys or the like can be given. As examples of the resin, acrylic resin, methacrylic resin, ABS (acrylonitrile butadiene styrene) resin, polycarbonate, polypropylene, polystyrene, polyester, polyether ketone, Teflon (registered trademark) or the like can be given. Further, a composite material (composite resin) in which an inorganic filler is filled in these resins can also be given as an example of a resin.

For example, when the workpiece body 1 is used for cutting (or grinding) out a dental product, the workpiece body 1 can be a zirconia pre-sintered body fired in a state in which zirconia crystal grains are not completely sintered. The zirconia pre-sintered body contains zirconia and stabilizer that suppresses phase transition of the crystal phase of zirconia. For example, the stabilizer suppresses phase transition of the crystal phase of the sintered body from tetragonal to monoclinic phase when it becomes a sintered body. As stabilizers, for example, oxides such as calcium oxide (CaO), magnesium oxide (MgO), yttrium oxide ($Y_2O_3$), cerium oxide ($CeO_2$) or the like can be given. It is preferable that the stabilizer is added in an amount so that the tetragonal zirconia grains can be partially stabilized. For example, when yttria is used as the stabilizer, a content of yttria is preferably 2 to 8 mol %, more preferably 2.5 to 6.5 mol % based on the total mol number of zirconia and yttria. If the content of the stabilizer is too high, phase transition can be suppressed, however, the bending strength and the fracture toughness decrease. On the other hand, if the content of the stabilizer is too low, the bending strength and the fracture toughness can be suppressed, however progress of phase transition can not be sufficiently suppressed. A zirconia partially stabilized by adding a stabilizer is called "partially stabilized zirconia". The content ratio of the stabilizer in the zirconia sintered body can be measured by, for example, inductively coupled plasma (ICP) emission spectroscopic analysis, fluorescent X-ray analysis or the like.

The holding member 2 is arranged on at least a part of the outer side of the protruding portion 1c. It is preferable that the holding member 2 is arranged in at least a protruding direction of the protruding portion 1c. It is preferable that the holding member 2 is continuously arranged along the fifth surface 1f corresponding to the side face of the protruding portion 1c. That is, the holding member 2 can cover at least a part of the fifth surface 1f of the protruding portion 1c. It is preferable that the holding member 2 has a shape corresponding to the planar shape of the workpiece body 1. The holding member 2 can have, for example, a ring, annular, tubular or ring shape. It is preferable that the holding member 2 is arranged over the entire circumference of the side wall of the workpiece body 1. A gap (or gaps) may exist between the holding member 2 and the workpiece body 1.

The holding member 2 can have a first surface 2a directed in the same direction as the first surface 1a of the workpiece body 1, and a second surface 2b directed in the same direction as the second surface 1b of the workpiece body 1. The first surface 2a of the holding member 2 can direct in the same direction as the third surface 1d of the workpiece body 1. The second surface 2b of the holding member 2 can direct in the same direction as the fourth surface 1e of the workpiece body 1. It is preferable that the first surface 2a of the holding member 2 and the third surface 1d of the workpiece body 1 are parallel or substantially parallel. It is preferable that the second surface 2b of the holding member 2 and the fourth surface 1e of the workpiece body 1 are parallel or substantially parallel.

The third surface 1d of the protruding portion 1c and the first surface 2a of the holding member 2 can form the same plane. Similarly, the fourth surface 1e of the protruding portion 1c and the second surface 2b of the holding member 2 can form the same plane. This is because the holding member 2 and the protruding portion 1c completely overlap each other. In this case, the thickness t3 of the holding member 2 is the same as the thickness t2 of the protruding portion 1c. Alternatively, the first surface 2a of the holding member 2 can exist on a side closer to the first surface 1a side of the workpiece body 1 than the third surface 1d of the protruding portion 1c. Similarly, the second surface 2b of the holding member 2 can exist on a side closer to the second surface 1b side of the workpiece body 1 than the fourth surface 1e of the protruding portion 1c. This is because the workpiece unit 10 is made easy to hold in the processing apparatus. In this case, the thickness t3 of the holding member 2 is thicker than the thickness t2 of the protruding portion 1c.

The thickness t3 of the holding member 2 may be any thickness if it is a thickness that does not hinder the processing of the workpiece body 1. It is preferable that the thickness t3 of the holding member 2 is thinner than the thickness t1 of the workpiece body 1 and more preferable that it is equal to the thickness t2 of the protruding portion 1c. This is because the workpiece unit 10 is made easy be held on the processing apparatus. The thickness t3 of the holding member 2 is preferably 1 mm or more, more preferably 2 mm or more, and furthermore preferably 4 mm or more. This is because the strength of holding by the processing apparatus is maintained.

It is preferable that the processing apparatus holds a portion at which the protruding portion 1c and the holding member 2 are combined. Therefore, it is preferable that the width w2 of the holding member 2 has a width that can be held to the processing apparatus together with the width w1 of the projecting section 1c.

In the first exemplary embodiment, the holding member 2 is attached to the workpiece body 1 without using an adhesive. At least a part of the holding member 2 and the fifth surface 1f are directly in contact with each other. It is preferable that the third surface (inner circumferential portion) 2c corresponding to the inner surface of the holding member 2 has a shape corresponding to the fifth surface 1f of the workpiece body 1. For example, in the cross-sectional view shown in FIG. 2, when the fifth surface 1f of the workpiece body 1 is flat, it is preferable that the third surface 2c of the holding member 2 is also flat. This is because tight adhesion between the workpiece body 1 and the holding member 2 is increased.

It is preferable that the material of the holding member 2 is a material which does not greatly deform by the pressure at the time of fixation when it is fixed to the processing apparatus. Also, it is preferable that the material of the holding member 2 is a material so that can be attached to the workpiece body 1 by the method explained below. As a material of the holding member 2, for example, engineering plastic, polypropylene, polystyrene, acrylic resin, ABS (acrylonitrile butadiene styrene) resin, polycarbonate, polyester, polyether ketone, Teflon (registered trademark), metal, wood or the like can be used. Further, examples of the resin can include a composite material (composite resin) filled with an inorganic filler in a resin.

Information can be added to the holding member 2. For example, information can be provided with a symbol such as a letter, a barcode or the like by printing, marking, sealing or the like at a position where the holding member 2 can be visually recognized. The information includes, for example, a lot number, a color tone (shade), a shrinkage ratio (dimensional reduction ratio upon firing or sintering), upper and lower discrimination and the like.

A method of manufacturing the workpiece unit according to the first exemplary embodiment is explained.

First, a workpiece body 1 is made. A partially stabilized zirconia powder which is zirconia particles containing a stabilizer is prepared. The kind and concentration of the stabilizer can be appropriately selected. The particle size and particle size distribution of the zirconia crystal grains are selected appropriately. As a method for adding the stabilizer to the zirconia particles, a suitable method such as a hydrolysis method, a neutralization coprecipitation method, an alkoxide method, a solid phase method or the like can be selected appropriately. If necessary, additives are added to the prepared partially stabilized zirconia powder and mixed. When wet mixing is used, the composition is dried.

Next, the composition is pressure-molded into a predetermined shape. For example, the composition is pressure-molded into a shape of the workpiece body 1. As the pressure molding method, a suitable method can be selected appropriately. The pressurizing pressure can be, for example, 20 MPa or more. After pressure-molding, CIP (Cold Isostatic Pressing) may be further applied to sintering composition at a pressure of, for example, 150 MPa or more. After pressure-molding, the molded body may be processed into a desired shape by cutting (turning), grinding or the like.

Next, the molded body is fired at a temperature at which the zirconia particles are not sintered to form a pre-sintered body. The pre-sintering conditions can be, for example, a pre-sintering temperature of 800° C. to 1200° C., and a holding time of 1 hour to 12 hours. The pre-sintered body may be processed into a desired shape by cutting, grinding or the like. For example, rather than shaping into the shape of the workpiece body 1 at the time of molding, the pre-sintered body may be molded into the shape of the workpiece body 1 (forming the protruding portion) after preparing the pre-sintered body. Thereby, the workpiece body 1 is made.

Next, the holding member 2 is prepared. The method of making the holding member 2 is not particularly limited. For example, the holding member 2 can be made by using injection molding, extrusion molding, cutting machining (grinding) or the like. In the case of the ring-shaped holding member 2, for example, the holding member 2 is heated to expand. The heating temperature of the holding member 2 can be appropriately set according to the material of the holding member 2. For example, when the holding member 2 is an engineering plastic, the heating temperature of the holding member 2 is preferably 60° C. or higher, more preferably 80° C. or higher. The heating temperature of the holding member 2 is preferably 150° C. or less, for example, it can be 120° C. or less or 100° C. or less. Next, in a state where the holding member 2 is expanded, the workpiece body 1 is fitted into the holding member 2 so that the protruding portion 1c comes into contact with the holding member 2. Then, the holding member 2 and the protruding portion 1c are subjected to positioning (alignment) followed by cooling the holding member 2. The holding member 2 shrinks when cooled. Thereby, the holding member 2 is mounted on the workpiece body 1 (so-called shrink fitting method). According to this method, the holding member 2 can be attached to the workpiece body 1 without using an adhesive.

FIGS. 4 and 5 show schematic cross-sectional views of a workpiece unit according to an example of the workpiece unit after processing the workpiece body 1. FIG. 5 is a schematic partial sectional view of a part of the protruding portion and the holding member. The worked item 4 is formed by attaching the workpiece unit 10 to the processing apparatus and by processing (machining) or the like the workpiece body 1. The worked item 4 can be ground out in a state of being connected to the outer edge portion 1h while leaving the outer edge portion 1h of the workpiece body 1 in a frame shape. The worked item 4 is, for example, a dental product as described above. Though forming the worked item 4, a cut portion 5 which has been ground off is formed in the workpiece body 1. The outer edge portion 1h is formed along the outer circumferential portion(s) 1g, while forming the worked item 4 and the cut portion 5. The outer edge portion 1h is a processing allowance (or margin) and acts as a frame of the worked item 4. The worked item 4 is connected to at least one of the outer edge portion 1h and the protruding portion 1c via the connecting portion 4a. After processing, as shown in FIGS. 4 and 5, the cut portion 5 which has resulted by grinding-off of the workpiece body 1 is formed at the vicinity of the outer edge of the workpiece body 1, while the width w3 of the outer edge portion 1h of the workpiece body 1 becomes thin. Even when the sufficient strength can not be obtained with the width w3 of the outer edge portion 1h, according to the workpiece unit 10 of the present disclosure, the outer edge portion 1h of the workpiece body 1 can be reinforced by the width (white double arrow) of the protruding portion 1c. That is, the thickness of the outer edge portion of the workpiece body 1 can be partially secured by the protruding portion 1c. Thereby, even when an impact is added to the workpiece body 1 after processing, fracture of the workpiece body 1 can be suppressed. Also, by providing the protruding portion 1c, it is possible to enlarge an allowable range of a positional displacement upon attaching the workpiece unit 10 to the processing apparatus.

Further, instead of forming the holding portion held to the processing apparatus with the workpiece body 1 itself, by substituting for it for the holding member 2, since a mold for manufacturing the workpiece body 1 can be made smaller by the width of the holding member 2, the amount of raw material used for the workpiece body 1 can be reduced. When the cost of the workpiece body 1 is higher than that of the holding member 2, it is possible to reduce the manufacturing costs of the workpiece unit 10 and the worked item 4.

In the first exemplary embodiment, no adhesive is used for attaching the holding member 2. Thereby, even when exposed to high temperature after processing, stress is applied from the holding member 2 to the workpiece body 1 due to a difference between the thermal expansion coefficient of the workpiece body 1 and the thermal expansion coefficient of the holding member 2, the workpiece body 1 after processing can be prevented from being damaged. Further, when it is desired to remove the holding member 2 from the workpiece body 1 after processing, the holding member 2 can be easily removed.

A workpiece unit according to a second exemplary embodiment of the present disclosure is explained. FIG. 6 shows a schematic partial cross-sectional view of a workpiece unit according to the second exemplary embodiment.

In addition to the configuration according to the first exemplary embodiment, the workpiece unit 20 further comprises an adhesive 3 for bonding the workpiece body 1 and the holding member 2. That is, the workpiece body 1 and the holding member 2 are at least partially bonded by the adhesive 3. It is preferable that the adhesive 3 is arranged within the range of the thickness of the protruding portion 1c and the holding member 2. It is preferable that the material of the adhesive 3 is such a material that does not cause positional displacement between the workpiece body 1 and the holding member 2. As the adhesive 3, for example, a thermosetting resin, a photocurable resin or the like can be used.

The method of manufacturing the workpiece unit 20 can be the same as the method for manufacturing according to the first exemplary embodiment. However, in the second exemplary embodiment, the workpiece body 1 and the holding member 2 can be bonded by the adhesive 3. Therefore, when using a holding member to which the shrink fitting method can not be applied, the second exemplary embodiment can be suitably applied.

The modes other than those mentioned above in the second exemplary embodiment are similar to the first exemplary embodiment. The second exemplary embodiment can be combined with at least one of the above exemplary embodiments in a possible range.

Also according to the second exemplary embodiment, it is possible to obtain a reinforcing effect by the protruding portion 1c similar to the first exemplary embodiment.

A workpiece unit according to a third exemplary embodiment of the present disclosure is explained. FIG. 7 shows a schematic partial cross-sectional view of a workpiece unit according to the third exemplary embodiment.

In the first and second exemplary embodiments, the holding member is arranged so as to cover the fifth surface of the protruding portion. In the workpiece unit 30 according to the third exemplary embodiment, the holding member 32 is arranged so as to cover not only the fifth surface 1f of the protruding portion 1c but also at least a part of the third surface 1d and the fourth surface 1e. That is, the holding member 32 can have a groove portion on a side facing the workpiece body 1. The holding member 32 can be arranged so that the protruding portion 1c fits into the groove portion.

It is preferable that a width w4 of the protruding portion 1c is the same as the width w1 in the first exemplary embodiment. It is preferable that a width (w4+w5) of the holding member 32 is the same as the width (w1+w2) in the first exemplary embodiment.

It is preferable that the thickness t4 of the protruding portion 1d is 1 mm or more in order to secure strength. It is preferable that the thickness t5 of the holding member 32 is equal to or less than the thickness of the workpiece body 1 in order to hold it on the processing apparatus.

The workpiece unit 30 can be manufactured similarly to the first exemplary embodiment.

The modes other than those mentioned above in the third exemplary embodiment are similar to the first exemplary embodiment. The third exemplary embodiment can be combined with at least one of the above exemplary embodiments in a possible range.

According to the third exemplary embodiment, the effect similar to the first exemplary embodiment can be obtained.

A workpiece unit according to a fourth exemplary embodiment of the present disclosure is explained. FIG. 8 shows a schematic partial cross-sectional view of a workpiece unit according to the fourth exemplary embodiment.

The fourth exemplary embodiment is similar to the third exemplary embodiment. In the third exemplary embodiment, the holding member is attached to the workpiece body without using the adhesive, whereas in the workpiece unit 40 according to the fourth exemplary embodiment, the holding member 32 is attached to the workpiece body 1 by using the adhesive 3. The place arranging the adhesive 3 is not limited to the illustrated mode, and may be anywhere if it is a place where the holding member 32 and the workpiece body 1 can be bonded together.

The workpiece unit 40 can be manufactured similarly to the first and second exemplary embodiments.

The modes other than those mentioned above in the fourth exemplary embodiment are similar to the first and third exemplary embodiments. The fourth exemplary embodiment can be combined with at least one of the above exemplary embodiments in a possible range.

According to the fourth exemplary embodiment, it is possible to obtain a reinforcing effect by the protruding portion 1c similar to the first exemplary embodiment.

A workpiece unit according to a fifth exemplary embodiment of the present disclosure is explained. FIG. 9 shows a schematic partial cross-sectional view of a workpiece unit according to the fifth exemplary embodiment.

In the third and fourth exemplary embodiments, the holding member is arranged so as to cover the third to fifth surfaces of the protruding portion, whereas in the workpiece unit 50 according to the fifth exemplary embodiment, the holding member 52 is arranged so as to cover one among the fifth surface 1f, the third surface 1d and the fourth surface 1e of the protruding portion 1c. In the mode shown in FIG. 9, the holding member 52 is arranged so as to cover the third surface 1d and the fifth surface 1f of the protruding portion 1c.

The holding member 52 has a first surface 52a directed in the same direction as the second and fourth surfaces 1b, 1e of the workpiece body 1. It is preferable that the holding member 52 is arranged so that the first surface 52a forms the same plane as the fourth surface 1e of the protruding portion 1c or exists on the second surface 1b side than the fourth surface 1e of the protruding portion 1c. This is because the attachment of the workpiece unit 50 to the processing apparatus is stabilized.

It is preferable that a width w6 of the protruding portion 1c is the same as the width w1 in the first exemplary embodiment. It is preferable that a width (w6+w7) of the holding member 52 is the same as the width (w1+w2) in the first exemplary embodiment.

It is preferable that the thickness t6 of the protruding portion 1d is preferably 1 mm or more in order to secure strength. The thickness t 7 of the holding member 52 is preferably equal to or less than the thickness of the workpiece body 1 in order to hold it on the processing apparatus.

It is preferable that the holding member 52 is arranged at a central area in the thickness direction of the workpiece body 1. In this case, the position of the protruding portion 1c can be shifted from the center in the thickness direction of the workpiece body 1.

The workpiece unit 50 can be manufactured similarly to the first exemplary embodiment.

The modes other than those mentioned above in the fifth exemplary embodiment are similar to the first exemplary embodiment. The fifth exemplary embodiment can be combined with at least one of the above exemplary embodiments in a possible range.

According to the fifth exemplary embodiment, it is possible to obtain the same effect as the first exemplary embodiment.

A workpiece unit according to a sixth exemplary embodiment of the present disclosure is explained. FIG. 10 shows a schematic partial cross-sectional view of a workpiece unit according to the sixth exemplary embodiment.

The sixth exemplary embodiment is a mode similar to the fifth exemplary embodiment. In the fifth exemplary embodiment, the holding member is attached to the workpiece without using the adhesive, whereas, in the workpiece unit 60 according to the sixth exemplary embodiment, the holding member 52 is attached to the workpiece body 1 by using the adhesive 3. The place arranging the adhesive 3 is not limited to the illustrated mode, may be anywhere if it is a place where the holding member 52 and the workpiece body 1 can be bonded.

The workpiece unit 60 can be manufactured similarly to the first, second and fifth embodiments.

The modes other than those mentioned above in the sixth exemplary embodiment are similar to the first and fifth exemplary embodiments. The sixth exemplary embodiment can be combined with at least one of the above exemplary embodiments in a possible range.

According to the sixth exemplary embodiment, it is possible to obtain a reinforcing effect by the protrusion 1 similar to the first exemplary embodiment.

A workpiece unit according to a seventh exemplary embodiment of the present disclosure is explained. FIG. 11 shows a schematic partial cross-sectional view of a workpiece unit according to the seventh exemplary embodiment. FIG. 12 shows a schematic partial plan view of the workpiece unit according to the seventh exemplary embodiment. FIG. 12 is a plan view seen from the side face side of the workpiece.

The seventh exemplary embodiment is the same mode as the third and fourth exemplary embodiments. In the third and fourth exemplary embodiments, the holding member is one component, whereas, in the workpiece unit 70 according to the seventh exemplary embodiment, the holding member 72 is composed of two or more parts. In the mode shown in FIGS. 11 and 12, the holding member 72 has a first portion 72a covering the third surface 1d of the protruding portion 1c and a second portion 72b covering the fourth surface 1e of the protruding portion 1c. The fifth surface 1f of the protruding portion 1c is covered with the first and second portions 72a 72b. The first and second portions 72a 72b have at least one concave and convex portions respectively on the side facing the fifth surface 1f of the protruding portion 1c. The first and second portions 72a, 72b are arranged so that the concave and convex portions are fitted with each other on the fifth surface 1f side of the protruding portion 1c. In the mode shown in FIG. 12, a boundary line between the first and second portions 72a, 72b is meandering.

In the first and second portions 72a, 72b, it is preferable that the regions formed the concave and convex portions have the same shape. It is more preferable that the first and second portions 72a, 72b have the same shape as a whole. It is more preferable that the first and second portion 72a, 72b are the same parts. In this case, the manufacturing and management of the holding member 72 can be simplified.

The workpiece unit 70 can be manufactured similarly to the first exemplary embodiment without forming the holding member 72 by combining a plurality of parts.

The modes other than those mentioned above in the seventh exemplary embodiment are similar to the first exemplary embodiment. The seventh exemplary embodiment can be combined with at least one of the above exemplary embodiments in a possible range.

According to the seventh exemplary embodiment, the effect similar to the first exemplary embodiment can be obtained. By providing irregularities on each portion of the holding member 72, positional displacement of each portion can be prevented. By making the holding member 72 into a plurality of parts, attachment of the holding member 72 to the workpiece body 1 can be made easier.

A workpiece unit according to a fourteenth exemplary embodiment of the present disclosure is explained. FIG. 13 shows a schematic partial cross-sectional view of a workpiece unit according to the fourteenth exemplary embodiment.

The fourteenth exemplary embodiment is a mode similar to the seventh exemplary embodiment. In the seventh exemplary embodiment, the holding member is attached to the workpiece without using the adhesive, whereas, in the workpiece unit 80 according to the fourteenth exemplary embodiment, the holding member 72 is attached to the workpiece body 1 with the adhesive 3. The place arranging the adhesive 3 is not limited to the illustrated mode, and may be anywhere if it is a place where the holding member 72 and the workpiece body 1 can be bonded.

The workpiece unit 80 can be manufactured similarly to the first, second and seventh exemplary embodiments.

The modes other than those mentioned above in the fourteenth exemplary embodiment are similar to the first and seventh exemplary embodiments. The fourteenth exemplary embodiment can be combined with at least one of the above exemplary embodiments in a possible range.

According to the fourteenth exemplary embodiment, a reinforcing effect can be obtained by the protruding portion similar to the first exemplary embodiment.

A workpiece unit according to a ninth exemplary embodiment of the present disclosure is explained. FIG. 14 shows a schematic partial cross-sectional view of a part of the holding member in the workpiece unit according to the ninth exemplary embodiment.

In the ninth exemplary embodiment, in addition to the configurations of the first to fourteenth exemplary embodiments, the workpiece body 91 and the holding member 92 further have a positioning portion.

In the workpiece unit 90, the workpiece body 91 has at least one first positioning portion 91h on a portion facing the holding member 92, in the protruding portion 91c. In the mode shown in FIG. 14, the first positioning portion 91h is arranged on the fifth surface 91f of the protruding portion 91c. The holding member 92 has at least one second positioning portion 92d on a portion facing the workpiece body 91, in the inner circumferential portion 92c. The first and second positioning portions 91h, 92d are portions for positioning the position of the holding member 92 for the workpiece body 91. The first and second positioning portions 91h, 92d can also suppress that the holding member 92 causes positional displacement to the workpiece body 91.

The first and second positioning portions 91h, 92d can be arranged at positions corresponding to each other. The first and second positioning portions 91h, 92d can have shapes corresponding to each other. For example, it is preferable that the first and second positioning portions 91h, 92d have a position and a shape such that at least a part of one of them is fitted with the other. In the mode shown in FIG. 14, the first positioning portion 91h is formed as a concave portion. The second positioning portion 92d is formed as a convex portion fitting with the concave portion of the first positioning portion 91h. The positions of the first and second positioning portions 91h, 92d may be anywhere if it is a portion where the outer circumferential portion(s) 91g of the workpiece body 91 and the inner circumferential portion 92c of the holding member 92 are facing each other.

It is preferable that at least a part of the tip of the convex portion can insert into the concave portion. It is preferable that the convex portion has a shape and a size abutting on the opening and/or the inner wall of the concave portion when inserted into the concave portion. For example, it is preferable that the width (for example, the size in the direction (vertical direction) connecting the first and second surfaces 91a, 91b of the workpiece body 91) of the convex portion is larger than that (the size in the vertical direction) of the concave portion. Thereby, by fitting or engaging the first and second positioning portions 91h, 92d, positional displacement of the holding member 92 to the workpiece body 91 can be suppressed.

FIGS. 15 to 18 show schematic plan views of examples according to the first and second positioning portions 91h, 92d. FIGS. 15 to 18 show a plan view of the first positioning portion 91h. The second positioning portion 92d also has a planar shape corresponding to the shape of the first positioning portion 91h. The illustration and explanation of the second positioning portion 92d are omitted. For example, as shown in FIGS. 15 and 16, the first positioning portion 91h can be formed as a continuous groove portion. The first positioning portion 91h may be a linear groove portion as shown in FIG. 15, or may be a zigzag or meandering groove portion as shown in FIG. 16. For example, as shown in FIGS. 17 and 18, the first positioning portion 91h can be formed as at least one partial or discontinuous point-like concave portion (for example, a conical or columnar shape) or a fragmentary groove portion. A dotted line by the first positioning portion 91h may be linear as shown in FIG. 17, or may be zigzag or meandering as shown in FIG. 18. Although FIGS. 15 to 18 show the first positioning portion 91h having a regular shape, the first positioning portion 91h may have an irregular shape.

Although in the mode shown in FIG. 14, the first and second positioning portions 91h, 92d have one triangular cross section, the first and second positioning portions 91h, 92d can have other cross-sectional shapes. FIGS. 19 to 22 show schematic partial sectional views of examples according to the first and second positioning portions 91h, 92d. For example, as shown in FIG. 19, the first and second positioning portions 91h, 92d can have a polygonal cross section such as a quadrangle or the like. As shown in FIG. 20, the first positioning portion 91h can have a cross-sectional shape (hemispherical shape) such as a semicircular, semielliptical or the like. On the other hand, the second positioning portion 92d may have a cross-sectional shape (hemispherical shape) such as a semicircular, semielliptical or the like, or may have a semicircular, semi-elliptical, or other cross-sectional shape (hemispherical shape) similar to that of the first positioning portion 91h, or may have a shape (triangular shape in FIG. 20) different from the first positioning portion 91h as shown in FIG. 20. As shown in FIG. 21, a part of the second positioning portion 92d may be engaged with the first positioning portion 91h. In the mode shown in FIG. 21, a width w22 of the second positioning portion 92d is equal to or larger than the width w21 of the first positioning portion 91h. A part of the second positioning portion 92d is inserted into the first positioning portion 91h and the first and second positioning portions 91h, 92d are partial contact at the upper and lower ends of the first positioning portion 91h. In this case, an outer circumferential portion(s) 91g of the workpiece body 91 and an inner circumferential portion 92c of the holding member 92 may not contact each other. Alternatively, as shown in FIG. 21, the holding member 92 may be deformed by, for example, its shrinkage, and partially contact the outer circumferential portion(s) 91g of the workpiece body 1 at the upper and lower ends of the inner circumferential portion 92c. Also, as shown in FIG. 22, in one cross section, the first and second positioning portions 91h, 92d can have a plurality of concave or convex portions.

It is preferable that the depth and/or the height of the first and/or second positioning portion(s) 91h, 92d are/is a depth and/or height at which the first and second positioning portions 91h, 92d can engage each other. The depth and/or the height of the first and/or second positioning portion(s) 91h, 92d may be, for example, 0.5 mm or more.

The method for manufacturing the workpiece unit 40 can be similar to the method for manufacturing according to the first exemplary embodiment.

The modes of the protruding portion and the holding member may adopt the modes similar to FIGS. 7 to 13. FIGS. 23 to 26 show another example of the protruding portion and the holding member.

In the workpiece unit 100 shown in FIG. 23, the holding member 102 is arranged so as to cover not only the fifth surface 91f of the protruding portion 91c but also at least a part of the third and fourth surfaces 91d, 91e. That is, the holding member 102 can have a groove portion for accommodating the protruding portion 91c on the workpiece body 91 side. The holding member 102 can be arranged so that the protruding portion 91c is fitted into the groove portion. The modes of the first and second positioning portions 91h, 102a may be the same as the above-described mode.

In the workpiece unit 110 shown in FIG. 24, the holding member 112 can be arranged so as to cover one among the fifth, third and fourth surfaces 91f, 91d, 91e of the protruding portion 91c. In the mode shown in FIG. 24, the holding member 112 is arranged so as to cover the third and fifth surfaces 91d, 91f of the protruding portion 91c.

The holding member 112 has a first surface 112a directed in the same direction as the second and fourth surfaces 91b, 91e of the workpiece body 91. It is preferable that the holding member 112 is arranged so that the first surface 112a forms the same plane as the fourth surface 91e of the protruding portion 91c or exists on the second surface 91b side than the fourth surface 91e of the protruding portion 91c. This is because the attachment of the workpiece unit 110 to the processing apparatus is stabilized. The modes of the first and second positioning portions 91h, 112b can be similar to the above-described modes. It is preferable that the holding member 112 is arranged at a central area in the thickness direction of the workpiece body 91. In this case, the position of the protruding portion 91c can be displaced from the center in the thickness direction of the workpiece body 91.

In the workpiece unit 120 shown in FIGS. 25 and 26, the holding member 122 is composed of two or more parts. FIG. 26 is a plan view seen from the side face side of the holding member 122. In the mode shown in FIGS. 25 and 26, the holding member 122 has a first portion 122a covering the third surface 91d of the protruding portion 91c, and a second portion 122b covering the fourth surface 91e of the protruding portion 91c. The fifth surface 91f of the protruding portion 91c is covered with the first and second portions 122a, 122b. The first and second portions 122a, 122b have at least one engaging portion respectively on the side facing the fifth surface 91f of the protruding portion 91c. For example, the first and second portions 122a, 122b are arranged so that the concave and convex portions fit on the fifth surface 91f side of the protruding portion 91c. In the mode shown in FIG. 26, the boundary line between the first and second portions 122a, 122b is meandering. The modes of the first and second positioning portions 91d, 122c can be similar to the above-described modes.

According to the modes shown in FIGS. 25 and 26, by providing engaging portions on each portion of the holding member 122, positional displacement of each portion can be prevented. By composing the holding member 122a of a plurality of parts, attachment of the holding member 122 to the workpiece body 91 can be made easier.

The modes other than those mentioned above in the ninth exemplary embodiment can be similar to the first to fourteenth exemplary embodiments. The ninth exemplary embodiment can be combined with at least one of the above exemplary embodiments in a possible range.

Also in the ninth exemplary embodiment, similarly to the above exemplary embodiment, the workpiece body 91 and the holding member 92 can be joined together via an adhesive (illustration is omitted).

In each mode of the ninth exemplary embodiment, the mode in which the first positioning portion of the workpiece body is located on the fifth surface of the protruding portion is shown, whereas the first positioning portion can be arranged on at least one among the third and fourth surfaces of the protruding portion. The second positioning portion can be arranged at a position corresponding to the first positioning portion.

According to the ninth exemplary embodiment, the effects similar to the first to fourteenth exemplary embodiments can be obtained.

According to the ninth exemplary embodiment, by combining the first and second positioning portions, the holding member can be attached to the workpiece body at an appropriate position. Also, even after the holding member is attached to the workpiece body, the first and second positioning portions fulfill a role of nonslip, and positional displacement of the holding member to the workpiece body can be suppressed.

A workpiece unit according to a tenth exemplary embodiment of the present disclosure is explained. FIG. 27 shows a schematic partial cross-sectional view of a workpiece unit according to the tenth exemplary embodiment.

In the ninth exemplary embodiment, the first positioning portion of the workpiece body is a concave portion, and the second positioning portion of the holding member is a convex portion. In the tenth exemplary embodiment, the concave and convex portions are reversed between the workpiece body 131 and the holding member 132. That is, the first positioning portion 131h arranged on the fifth surface 131f of the protruding portion 131c of the workpiece body 131 is a convex portion. The second positioning portion 132d arranged on the inner circumferential portion 132c of the holding member 132 is a concave portion corresponding to the first positioning portion 131h.

The method for manufacturing the workpiece unit 130 can be similar to the method for manufacturing according to the first exemplary embodiment.

The modes other than those mentioned above in the tenth exemplary embodiment can be similar to the first to ninth exemplary embodiments. The tenth exemplary embodiment can be combined with at least one of the above exemplary embodiments in a possible range.

Also in the tenth exemplary embodiment, similarly to the above exemplary embodiments, the workpiece body 131 and the holding member 132 can be joined together via an adhesive (illustration is omitted).

According to the tenth exemplary embodiment, the effects similar to the first to ninth exemplary embodiments can be obtained.

A workpiece unit according to an eleventh exemplary embodiment of the present disclosure is explained. In the eleventh exemplary embodiment, the workpiece body has a plurality of parts. FIG. 28 shows a schematic plan view of a workpiece unit according to the eleventh exemplary embodiment. FIG. 29 shows a schematic cross-sectional view of the workpiece unit along line XXVIII-XXVIII in FIG. 28.

In the workpiece unit 140, the workpiece body 141 is physically divided into a plurality of sections 142. One workpiece body 141 is configured by combining the plurality of sections 142. At least two among the plurality of sections 142 can have different compositions respectively. For example, each section 142 can contain a different colorant. At least two among the plurality of sections 142 can have the same composition, and all of the sections 142 may have the same composition. The main material of each section 142 may be the same or different. It is preferable that one section 142 is smaller than the size that can be held or fixed to the processing apparatus.

At least one among the plurality of sections 142 can be a part to be processed by the processing apparatus. At least one of the plurality of sections 142 may be a part not to be processed by the processing apparatus. At least one of the plurality of sections 142 may be a dummy workpiece body for compensating the size of the workpiece body 141 and for making a size that the workpiece body 141 can be held to the processing apparatus.

It is preferable that the workpiece body 141 is divided by each section 142 so as to divide the first and second surfaces 141a, 141b of the workpiece body 141. The number of the sections 142 relative to one workpiece body 141 can be appropriately set. The size of one section 142 can be appropriately adjusted according to demand or the like of each composition or the like. The plurality of sections 142 may be the same or different size.

At least one section 142 can have at least a part of the protruding portion 141c of the workpiece body 141. The mode of the protruding portion 141c can be similar to the above exemplary embodiments. By combining the plurality of sections 142, the protruding portions 141c can be made continuous.

The shape of each section 142 may be any shape. The plurality of sections 142 may have the same or different shapes. When the planar shape of the workpiece body 141 is a circular shape, it is preferable to divide the workpiece body 141 so that the section 142 passes through the center of the circular shape. For example, the section 142 can have a fan-shaped planar shape. When the section 142 has a fan shape, it is preferable that the radius of the fan shape is the same. Thereby, the workpiece body 141 having a circular or elliptical shape by radially combining the plurality of sections 142 so that each arc is continuous can be configure. It is preferable that the sum of the center angles of the plurality of sections 142 is 360°. The size of the center angle of each fan shape may be any, and can be, for example, 45°, 60°, 90°, 120°, 180° (ie, semicircular, semielliptical or the like), 240°, 270°, 300°, 315° or the like.

It is preferable that the plurality of sections 142 has the same thickness respectively. Thereby, both the first and second surfaces 141a, 141b can be formed to a flat surface. Also, positioning in the thickness direction when fixing the workpiece unit 140 to the processing apparatus makes easier.

In the mode shown in FIGS. 28 and 29, the workpiece body 141 has a first, second and third sections 142a, 142b, 142c. The first, second and third sections 142a, 142b, 142c have the same shape. The first, second and third sections 142a, 142b, 142c have the same size. The first, second and third sections 142a, 142b, 142c have a planar shape in which both surfaces are a fan (sector) shape. The central angle of the fan shape is 120°. The first, second and third sections 142a, 142b, 142c are radially arranged and configure a circular workpiece body 141. Both surfaces of the first, second and third sections 142a, 142b, 142c are arranged on the same plane, and the first and second surfaces 141a, 141b are configured in a plane.

FIGS. 30 to 33 show a schematic plan view of a workpiece according to an example of a plane shape of a section. FIGS. 30 to 33 show a state in which sections configuring one workpiece are separated. In the mode shown in FIG. 30, the sections 142a, 142b, 142c have a fan-shaped plane shape with a central angle of 120°. In the mode shown in FIG. 31, the sections 142a, 142b have a semicircular planar shape. In the mode shown in FIG. 32, the section 142a has a semicircular planar shape, and the sections 142b, 142c have a fan-shaped planar shape with a central angle 90°. In the modes shown in FIGS. 30 to 32, the radius of each section is the same size. In the mode shown in FIG. 33, the sections 142a to 142f have no fan-shaped planar shape, but are configured to achieve a circular shape in combination.

FIG. 34 shows a schematic plan view of a workpiece body according to another mode of a workpiece body. In the adjacent sections 142, the sections 142 may be directly contacted each other. Alternatively, as shown in FIG. 34, the workpiece body 141 may further have a cushioning (buffer) material 143 in at least a part between adjacent sections 142. It is preferable that the cushioning material 143 is a material so that can absorb irregularities on the end face of the section 142. The cushioning material 143 may be an adhesive for bonding the sections 142 to each other. As the cushioning material 143, for example, a resin sheet can also be used. In the mode shown in FIG. 34, although the cushioning material 143 arranged entirely between the sections 142 is shown, the cushioning material 143 may be partially arranged between the sections 142. By using the cushioning material 143, it is possible to suppress mismatching of combination due to irregularities of the end face of the section 142. Also, by using the adhesive as the cushioning material 143, the bonding strength between the sections 142 can be enhanced.

FIG. 35 shows a schematic side view of a workpiece body according to another mode of a workpiece body. The section 142 can have an engaging portion engaging with the adjacent section 142 on the end face facing the adjacent section 142. As shown in FIG. 35, the engaging portion can be, for example, a concave portion 142g formed on the end face of the section 142a, and a convex portion 142h formed on the end face of the section 142b and fitted with the concave portion 142g. In addition to the engaging portion, the workpiece body 141 may further have a cushioning material 143 as shown in FIG. 34. By providing the engaging portion, the bonding strength between the sections 142 can be enhanced.

In the case where the section 142 is a section-not-to-be-processed (dummy workpiece body), as the material of the unprocessed section 142, it is possible to use a material the workpiece unit 140 can be held on the processing apparatus and has strength in which the processing section 142 can be processed in addition to the above-mentioned materials.

The modes other than those mentioned above in the eleventh exemplary embodiment can be similar to the first to tenth exemplary embodiments. The eleventh exemplary embodiment can be combined with at least one of the above exemplary embodiments in a possible range.

According to the eleventh exemplary embodiment, the effects similar to the first to tenth exemplary embodiments can be obtained.

According to the eleventh exemplary embodiment, the workpiece body can comprise a plurality of sections having different compositions. Each section can adjust its size and shape according to demand. Thereby, it is possible to increase the utilization efficiency of the workpiece body and to reduce wasteful workpiece body. Further, the workpiece body can also be manufactured and sold in units of sections. Furthermore, it is possible to make workpiece items of different compositions by a single processing with a processing apparatus.

A workpiece unit according to a twelfth exemplary embodiment of the present disclosure is explained. FIG. 36 shows a schematic plan view of a workpiece unit in the twelfth exemplary embodiment. FIG. 37 shows a schematic plan view of a section unit in the twelfth exemplary embodiment. In the eleventh exemplary embodiment, one holding member is applied to the section. In the twelfth exemplary embodiment, a part of the holding member is arranged for each section.

The workpiece unit 150 according to the twelfth exemplary embodiment comprises a plurality of section units 151. Each section unit 151 has a section 142, and a covering member 152 arranged on at least a part of a side face of the section 142. The section 142 can be similar to the section of the eleventh exemplary embodiment. The size of one section unit 151 can be made smaller than the size that can be held to the processing apparatus.

In the mode shown in FIG. 37, the covering member 152 surrounds the outer circumferential portion(s) (side face) of the section 142. The covering member 152 can be similar to the holding members in the first to eleventh exemplary embodiments except that it surrounds one section. The covering member 152 forms a holding member that is held to the processing apparatus when the workpiece unit 150 is configured by combining a plurality of section units 151. A part of one covering member 152 configures a part of the holding member. By combining a plurality of section units 151, a holding member that a part of the covering member 152 continuously surrounds the combination of the sections 142 is formed. For example, when the section 142 is a fan shape, a part arranged on the circular arc section of the section 142 among the covering member 152 configures a holding member. The portion not configuring the holding member of the covering member 152 can act as a cushioning portion for smoothly bonding with the adjacent section.

The section units 151 can be joined together via an adhesive (not shown). Alternatively, an engaging portion for engaging the covering members 152 with each other may be provided in a part where the covering members 152 face each other.

FIG. 38 shows a schematic plan view of a section unit according to another mode of that shown in FIG. 37. In the mode shown in FIG. 37, the covering member is arranged over the entire circumference of the section. In the section unit 153 according to the mode shown in FIG. 38, the covering member 154 is arranged only on a part of the side face of the section 142. By combining the section unit 153 similarly to the combination shown in FIG. 36, a workpiece unit as shown in FIG. 28 can be configured. The covering member 154 is arranged in a part that acts as a holding member when the partitioning units are combined. In the mode shown in FIG. 38, the covering member 154 is arranged along the circular arc portion of the section 142. The covering member 154 is not provided on a portion(s) facing the adjacent section(s) 142 when combining the section units 153 among (with respect to) the side faces of the sections 142. The section unit 153 shown in FIG. 38 is similar to the section unit shown in FIG. 37 except that the placement position of the covering member 154 is different.

The section units 153 can be joined together via an adhesive (not shown). Alternatively, an engaging portion for engaging the sections 142 with each other may be provided in a part where the sections 142 face each other.

The modes other than those mentioned above in the twelfth exemplary embodiment can be similar to the first to eleventh exemplary embodiments. The twelfth exemplary embodiment can be combined with at least one of the above exemplary embodiments in a possible range.

According to the twelfth exemplary embodiment, the effects similar to the first to eleventh exemplary embodiments can be obtained. Since the section unit can be manufactured or sold for each section unit, the user can arbitrarily set the combination of compositions in the workpiece unit by manufacturing or purchasing the section unit according to the demand.

A workpiece unit according to a thirteenth exemplary embodiment of the present disclosure is explained. FIG. 39 shows a schematic plan view of a workpiece unit in the thirteenth exemplary embodiment. FIG. 40 shows a schematic plan view of a dummy workpiece body in the thirteenth exemplary embodiment. In the twelfth exemplary embodiment, a plurality of section units are combined to configure a workpiece unit. In the thirteenth exemplary embodiment, the workpiece unit 160 is configured by using one section unit.

The workpiece unit 160 comprises a section unit 151 and a dummy workpiece body 161. The section unit 151 is similar to the section unit 151 according to the twelfth exemplary embodiment. The dummy workpiece body 161 is one that can hold the section unit 151 on the processing apparatus by supplementing (or compensating) the size of the section unit 151. The dummy workpiece body 161 can have a holding portion 161*a* for holding in the processing apparatus. The holding portion 161*a* has the same function as the holding member. The holding portion 161*a* may be integrally formed as a part of the dummy workpiece body 161 or may be formed as a separate member. In the mode shown in FIGS. 39 and 40, the dummy workpiece body 161 has a planar shape combining three section units 151. In the mode shown in FIGS. 39 and 40, the dummy workpiece body 161 has a planar shape so as to form a circular shape by combining with the section unit 151.

The shape and size of the dummy workpiece body 161 can be designed according to (in association with) the shape and size of the section unit 151. The dummy workpiece body 161 has a thickness that can be held to the processing apparatus. The material of the dummy workpiece body 161 may be any material if it is a material that can process the section by holding to the processing apparatus. As the material of the dummy workpiece body 161, for example, the same material as the holding member can be used.

The dummy workpiece body 161 and the section unit 151 can be bonded via, for example, an adhesive (not shown). Alternatively, an engaging portion for engaging the dummy workpiece body 161 and the section unit 151 may be provided in a part where the dummy workpiece body 161 and the section unit 151 face each other.

It is preferable that the dummy workpiece body 161 can be used repeatedly. It is preferable that the section unit 151 is detachable from the dummy workpiece body 161.

FIG. 41 shows a schematic plan view of a workpiece unit according to another mode of that shown in FIG. 39. The workpiece unit 163 comprises a section (workpiece body) 144, a dummy workpiece body 164 holding the section 144, and an adhesive 145 joins the section 144 and the dummy workpiece body 164. The dummy workpiece body 164 has an annular or tubular structure with an opening hollowed out in the size of the section 144. The dummy workpiece body 164 can have a holding portion 164a for holding to the processing apparatus. In the mode shown in FIG. 41, the section 144 is concentrically fitted in the opening of the dummy workpiece body 164 and bonded by the adhesive 145. The size (for example, radius) of the section 144 can be 80% or less, 60% or less, 50% or less, or 40% or less of the size (for example, radius) that can be held to the processing apparatus.

It is preferable that the dummy workpiece body 164 has a strength so as not to be deformed during processing by the processing apparatus.

The modes other than those mentioned above in the thirteenth exemplary embodiment can be similar to the first to twelfth exemplary embodiments. The thirteenth exemplary embodiment can be combined with at least one of the above exemplary embodiments in a possible range.

According to the thirteenth exemplary embodiment, the effects similar to the first to twelfth exemplary embodiments can be obtained. It is not necessary to enlarge the workpiece body to a size that it can be held to the processing apparatus. Thereby, even if the workpiece body is a composition with low demand, it can be processed without requiring a workpiece body of another composition.

A workpiece unit according to a fourteenth exemplary embodiment of the present disclosure is explained. In the eleventh exemplary embodiment, the sections are physically separated from each other. In the fourteenth exemplary embodiment, at least two sections in the workpiece body are not physically separated and can be integrally formed. A schematic plan view and a schematic cross-sectional view of the workpiece unit in the fourteenth exemplary embodiment can be similar to FIGS. 27 and 28.

It is preferable that the adjacent sections 142 are bonded together. Therefore, the materials of the adjacent sections 142 are preferably materials that can be bonded by firing, and more preferably materials that the main material is the same. For example, the adjacent sections 142 may be zirconia with different types and/or content rate of additives such as colorants or the like.

A method for manufacturing the workpiece unit according to the fourteenth exemplary embodiment is similar to the method for manufacturing described in the above exemplary embodiments except that a plurality of sections are integrally formed. Regarding molding of a workpiece body, first, a removable partition(s) is (are) provided in a mold to form the mold of sections of a desired shape. The partition(s) is(are) arranged at a boundary of the section. Next, after supplying the composition to the area of each section, the partition(s) is(are) removed. Next, the composition is press-molded, whereby a molded body in which a plurality of compositions are integrated can be molded. The method after sintering (or firing) of the molded body is similar to in the above exemplary embodiments.

The modes other than those mentioned above in the fourteenth exemplary embodiment can be similar to the first to thirteenth exemplary embodiments. The fourteenth exemplary embodiment can be combined with at least one of the above exemplary embodiments in a possible range.

According to the fourteenth exemplary embodiment, the effects similar to the first to thirteenth exemplary embodiments can be obtained. Also, a member for holding a plurality of sections, such as a holding member, an adhesive and the like, becomes unnecessary.

The disclosure of the above patent literature is incorporated herein by reference thereto. Although the workpiece unit and the method for manufacturing thereof according to the present invention are explained based on the above exemplary embodiments, needless to say, it is not limited to the above exemplary embodiments, and a variety of modifications, changes and improvements to various disclosed elements (including each element of each claim, each element of each exemplary embodiment and example, each element of each drawing, and the like) can be included within the scope of the entire disclosure (including the claims and drawings) of the present invention, and based on the basic technical idea of the present invention. Also, the present invention can combine, substitute or select various disclosed elements (including each element of each claim, each element of each exemplary embodiment and example, each element of each drawing, and the like) within the scope of the entire disclosure of the present invention appropriately.

Further problems, objectives and development modes of the present invention will become apparent from the entire disclosure including the claims.

With regard to a numerical range(s) in the description, it should be interpreted that any value(s) and sub-range(s) that are included in the range are concretely stated even if not explicitly stated.

Part or all of the above described exemplary embodiments may also be stated as in appendixes (remarks) which may be termed "mode" or "modes" shown below, though not restrictively.

[Mode 1]

A workpiece unit, comprising:

a workpiece body; and a holding member arranged on at least a part of an outer circumferential portion(s) of the workpiece body, and directly contacting at least a part of the outer circumferential portion(s).

[Mode 2]

The workpiece unit according to the mode, wherein the holding member is continuously arranged along the outer circumferential portion(s).

[Mode 3]

The workpiece unit according to the mode(s), wherein the holding member has a ring shape.

[Mode 4]

The workpiece unit according to the mode(s), wherein a thickness of the holding member is thinner than that of the workpiece.

[Mode 5]

The workpiece unit according to the mode(s), wherein the holding member is arranged at a central area in the thickness direction of the workpiece.

[Mode 6]

A workpiece unit, comprising:

a workpiece body; and a holding member arranged on at least a part of an outer circumferential portion(s) of the workpiece body; wherein the workpiece body has at least one first positioning portion in a part facing the holding member, and the holding member has a second positioning portion engaging with at least a part of the first positioning portion.

[Mode 7]

The workpiece unit according to the mode, wherein
the first positioning portion has a concave or convex shape,
the second positioning portion has a shape fitting with the first positioning portion, and
at least a part of one of the first and second positioning portions fits with at least a part of the other.

[Mode 8]

The workpiece unit according to the mode(s), wherein the first positioning portion is arranged over the entire circumference of the workpiece body.

[Mode 9]

The workpiece unit according to the mode(s), wherein the first or second positioning portion has a groove shape.

[Mode 10]

The workpiece unit according to the mode(s), wherein the first or second positioning portion has a conical or columnar shape.

[Mode 11]

The workpiece unit according to the mode(s), wherein
the workpiece has a protruding portion protruding from the outer circumferential portion,
the first positioning portion is arranged on the protruding portion, and
the holding member is arranged in at least a protruding direction of the protruding portion.

[Mode 12]

The workpiece unit according to the mode(s), wherein
the protruding portion is continuously arranged along the outer circumferential portion(s) of the workpiece body, and
the holding member has a ring shape.

[Mode 13]

The workpiece unit according to the mode(s), wherein
the workpiece body has a first surface, and a second surface arranged on a side opposite to the first surface,
the outer circumferential portion(s) is arranged between the first and second surfaces,
the protrusion portion has a third surface directed in the same direction as the first surface, a fourth surface directed in the same direction as the second surface, and a fifth surface connecting the third and fourth surfaces, and
the holding member covers at least a part of the fifth surface.

[Mode 14]

The workpiece unit according to the mode(s), wherein the holding member has a first surface directed in the same direction as the third surface of the protruding portion, and a second surface directed in the same direction as the fourth surface of the protruding portion.

[Mode 15]

The workpiece unit according to the mode(s), wherein the first surface of the holding member forms the same plane as the third surface of the protruding portion, or exists on a side closer to the first surface of the workpiece body than the third surface of the protruding portion.

[Mode 16]

The workpiece unit according to the mode(s), wherein the second surface of the holding member forms the same plane as the fourth surface of the protruding portion, or exists on a side closer to the second surface of the workpiece body than the fourth surface of the protruding portion.

[Mode 17]

The workpiece unit according to the mode(s), wherein the holding member further covers at least a part of the third and fourth surfaces of the protruding portion.

[Mode 18]

The workpiece unit according to the mode(s), wherein the holding member is composed of two or more parts.

[Mode 19]

The workpiece unit according to the mode(s), wherein
each part of the holding member has a concave or convex portion respectively,
each of the parts is arranged so as to fit the concave and convex portions.

[Mode 20]

The workpiece unit according to the mode(s), wherein the workpiece body is ceramic, metal or resin.

[Mode 21]

The workpiece unit according to the mode(s), wherein the workpiece body is a pre-sintered body in which the zirconia crystal grains are not completely sintered.

[Mode 22]

The workpiece unit according to the mode(s), wherein the protruding portion is a part of the pre-sintered body.

[Mode 23]

The workpiece unit according to the mode(s), wherein the holding member is bonded to the workpiece body via an adhesive.

[Mode 24]

The workpiece unit according to the mode(s), wherein the holding member and the workpiece body are in direct contact with each other.

[Mode 25]

The workpiece unit according to the mode(s), wherein the holding member is plastic.

[Mode 26]

The workpiece unit according to the mode(s), wherein a thickness of the protruding portion and that of the holding member are the same.

[Mode 27]

The workpiece unit according to the mode(s), wherein a width of the protruding portion in the protruding direction is 0.3 mm to 2 mm.

[Mode 28]

The workpiece unit according to the mode(s), wherein the protruding portion is arranged at a central area in the thickness direction of the workpiece body.

[Mode 29]

The workpiece unit according to the mode(s), wherein the workpiece body comprises a worked item formed by processing the workpiece body, the worked item being connected to the protruding portion or the outer edge portion of the workpiece body.

[Mode 30]

A workpiece unit, comprising a workpiece body having a plurality of sections,
wherein the section divides a surface-to-be-processed of the workpiece body.

[Mode 31]

The workpiece unit according to the mode, wherein the plurality of sections are integrally formed.

[Mode 32]

The workpiece unit according to the mode(s), wherein the plurality of sections has a different composition respectively.

[Mode 33]

The workpiece unit according to the mode(s), further comprising a holding member surrounding at least the outer circumferential portion(s) of the workpiece body.

[Mode 34]
The workpiece unit according to the mode(s), wherein the workpiece body is divided for each of the sections.
[Mode 35]
The workpiece unit according to the mode(s), wherein at least two of the plurality of sections have different compositions.
[Mode 36]
The workpiece unit according to the mode(s), wherein the section has a shape engaging with an adjacent section.
[Mode 37]
The workpiece unit according to the mode(s), further comprising a cushioning material arranged between adjacent sections.
[Mode 38]
The workpiece unit according to the mode(s), wherein the cushioning material contains a resin.
[Mode 39]
The workpiece unit according to the mode(s), further comprising a holding member surrounding at least the outer circumferential portion(s) of the workpiece body.
[Mode 40]
The workpiece unit according to the mode(s), wherein the holding member maintains a combination of the plurality of sections.
[Mode 41]
The workpiece unit according to the mode(s), wherein
the holding member is composed of a plurality of parts,
the parts of the holding member are arranged in the sections of the workpiece body respectively.
[Mode 42]
The workpiece unit according to the mode(s), further comprising a covering member surrounding the outer circumferential portion(s) of the section.
[Mode 43]
The workpiece unit according to the mode(s), wherein the portions of the holding member are at least a part of the covering member.
[Mode 44]
The workpiece unit according to the mode(s), wherein the covering member has a shape engaging with a covering member surrounding an adjacent section.
[Mode 45]
The workpiece unit according to the mode(s), wherein a planar shape of the section has a fan shape.
[Mode 46]
The workpiece unit according to the mode(s), wherein the plurality of sections compose the workpiece body having a circular planar shape by combined.
[Mode 47]
The workpiece unit according to the mode(s), wherein the plurality of sections have the same shape respectively.
[Mode 48]
The workpiece unit according to the mode(s), wherein one section among the plurality of sections is a part not processed by the processing apparatus.
[Mode 49]
The workpiece unit according to the mode(s), wherein the one section is smaller than a size that can be fixed to the processing apparatus.
[Mode 50]
A method for manufacturing a workpiece unit, comprising
preparing a workpiece body;
preparing a holding member having a ring shape;
expanding the holding member by heating;
fitting the workpiece body into the ring of the holding member; and
contracting the holding member by cooling to attach the holding member to the outer circumferential portion(s) of the workpiece body.
[Mode 51]
A method for manufacturing a workpiece unit, comprising
preparing a workpiece body having a first positioning portion on an outer circumferential portion(s) thereof;
preparing a holding member having a second positioning portion; and
attaching the holding member to the outer circumferential portion(s) of the workpiece body so that the first and second positioning portions correspond to each other.
[Mode 52]
A method for manufacturing a workpiece unit, comprising
preparing a plurality of sections to be components of a workpiece body;
forming the workpiece body having a first surface, a second surface arranged on the opposite side of the first surface, and an outer circumferential portion(s) between the first and second surfaces by combined the plurality of sections;
preparing a holding member having a ring shape;
expanding the holding member by heating;
fitting the workpiece body into the ring of the holding member; and
contracting the holding member by cooling to attach the holding member to the outer circumferential portion(s) of the workpiece body.
[Mode 53]
The method for manufacturing the workpiece unit according to the mode(s), wherein
the first positioning portion is a concave or convex portion,
in the attaching the holding member, the first and second positioning portions are fitted together.
[Mode 54]
The method for manufacturing the workpiece unit according to the mode(s), wherein
the attaching the holding member comprises:
expanding the holding member having a ring shape by heating;
fitting the workpiece body into the ring of the holding member; and
contracting the holding member by cooling.
[Mode 55]
The method for manufacturing the workpiece unit according to the mode(s), wherein
the workpiece body has a protruding portion protruding from the outer circumferential portion(s), and
the first positioning portion is arranged in the protruding portion.
[Mode 56]
The method for manufacturing the workpiece unit according to the mode(s), wherein in the expanding the holding member, the holding member is heated to 60° C. to 150° C.
[Mode 57]
The method for manufacturing the workpiece unit according to the mode(s), wherein the holding member includes an engineering plastic.

INDUSTRIAL APPLICABILITY

The present disclosure can be applied, for example, to the production of a dental prosthesis.

REFERENCE SIGNS LIST

10, 20, 30, 40, 50, 60, 70, 80, 90, 100, 110, 120, 130, 140, 150, 160, 163 Workpiece unit 1, 91, 131, 141 Workpiece body
1a, 91a, 131a, 141a First surface
1b, 91b, 131b, 141b Second surface
1c, 91c, 131c, 141c Protruding portion
1d, 91 d, 131d Third surface
1e, 91 e, 131e Fourth surface
1f, 91f, 131f Fifth surface
1g, 91g, 131g Outer circumferential portion(s)
1h Outer edge portion
2, 32, 52, 72, 92, 102, 112, 122, 132 Holding member
2a, 92a, 112a, 132a First surface
2b, 92b, 132b Second surface
2c, 92c, 132c Third surface (inner circumferential portion)
3 Adhesive
4 Worked item
4a Connecting portion
5 Cut portion
52a First surface
72a First portion
72b Second portion
91h, 131h First positioning portion
92d, 102a, 112b, 122c, 132d Second positioning portion
122a First portion
122b Second portion
142, 144 Section
142a to 142f First to sixth section
142g Concave portion
142h Convex portion
143 Cushioning material
145 Adhesive
151, 153 Section unit
152, 154 Covering member
161, 164 Dummy workpiece body
161a, 164a Holding portion

The invention claimed is:

1. A workpiece unit, comprising:
a workpiece body having a protruding portion; and
a holding member arranged on at least a part of an outer side of the protruding portion,
wherein the workpiece body itself has the protruding portion;
the workpiece body is integrated with the holding member;
when holding or fixing the workpiece unit to the processing apparatus, at least the holding member is held to a processing apparatus; and
information is added to the holding member,
wherein the holding member only contacts the outer circumference of the workpiece on the face of the plane perpendicular to the workpiece body.

2. The workpiece unit according to claim 1, wherein
the workpiece body has a first surface, a second surface arranged on a side opposite to the first surface, and an outer circumferential portion(s) provided between the first and second surfaces, and
the protruding portion is arranged on the outer circumferential portion(s).

3. The workpiece unit according to claim 2, wherein
the protruding portion is continuously arranged along the outer circumferential portion(s) of the workpiece body, and
the holding member has a ring shape.

4. The workpiece unit according to claim 2, wherein
the protruding portion has a third surface directed in the same direction as the first surface, a fourth surface directed in the same direction as the second surface, and a fifth surface connecting the third and fourth surfaces, and
the holding member covers at least a part of the fifth surface.

5. The workpiece unit according to claim 4, wherein the holding member has a first surface directed in the same direction as the third surface of the protruding portion, and a second surface directed in the same direction as the fourth surface of the protruding portion.

6. The workpiece unit according to claim 5, wherein the first surface of the holding member forms the same plane as the third surface of the protruding portion.

7. The workpiece unit according to claim 5, wherein the second surface of the holding member forms the same plane as the fourth surface of the protruding portion.

8. The workpiece unit according to claim 1, wherein
the workpiece body has at least one first positioning portion in a part facing the holding member in the protruding portion, and
the holding member has a second positioning portion engaging with at least a part of the first positioning portion.

9. The workpiece unit according to claim 8, wherein
the first positioning portion has a concave or convex shape,
the second positioning portion has a shape fitting or engaging with the first positioning portion, and
at least a part of one of the first and second positioning portions fits or engages with at least a part of the other.

10. The workpiece unit according to claim 8, wherein
one of the first and second positioning portions has a concave shape and the other has a convex shape,
the convex shape has a width equal to or larger than that of the concave shape, and
a part of the convex shape is inserted into the concave shape.

11. The workpiece unit according to claim 8, wherein the first positioning portion is arranged over the entire circumference of the workpiece body.

12. The workpiece unit according to claim 8, wherein the first or second positioning portion has a groove shape.

13. The workpiece unit according to claim 8, wherein the first or second positioning portion has a conical or columnar shape.

14. The workpiece unit according to claim 1, wherein the holding member comprises two or more parts.

15. The workpiece unit according to claim 14, wherein
each part of the holding member has a concave or convex portion respectively, and
each of the parts is arranged so as to fit the concave and convex portions each other.

16. The workpiece unit according to claim 1, wherein the workpiece body is ceramic, metal or resin.

17. The workpiece unit according to claim 1, wherein the workpiece body is a pre-sintered body in which zirconia crystal grains are not completely sintered.

18. The workpiece unit according to claim 1, wherein the holding member is bonded to the workpiece body via an adhesive.

19. The workpiece unit according to claim 1, wherein the holding member and the workpiece body are in direct contact with each other.

20. The workpiece unit according to claim 1, wherein the holding member is plastic.

21. The workpiece unit according to claim 1, wherein a thickness of the protruding portion and that of the holding member are substantially the same.

22. The workpiece unit according to claim 1, wherein a width of the protruding portion in a protruding direction is 0.3 mm to 2 mm.

23. The workpiece unit according to claim 1, wherein the protruding portion is arranged at a central area in the thickness direction of the workpiece body.

24. The workpiece unit according to claim 1, wherein the workpiece body comprises a worked item formed by processing the workpiece body, the worked item being connected to the protruding portion or the outer edge portion of the workpiece body.

25. The workpiece unit according to claim 1, wherein the workpiece body is one manufactured by pressure-molding a composition into a predetermined shape configured to form the workpiece body.

26. A workpiece unit, comprising:
a workpiece body having a plate shape and a protruding portion; and
a holding member arranged on at least a part of an outer side of the protruding portion and in at least a protruding direction of the protruding portion,
wherein the workpiece body itself has the protruding portion and the protruding portion protrudes from a side face of the workpiece body;
the workpiece body is integrated with the holding member;
when holding or fixing the workpiece unit to the processing apparatus, at least the holding member is held to a processing apparatus; and
information is added to the holding member,
wherein the holding member only contacts the outer circumference of the workpiece on the face of the plane perpendicular to the workpiece body.

* * * * *